United States Patent
Yoshizawa

(10) Patent No.: US 9,914,225 B2
(45) Date of Patent: Mar. 13, 2018

(54) ROBOT APPARATUS

(71) Applicant: CANON KABUSHIKI KAISHA, Tokyo (JP)

(72) Inventor: Akitaka Yoshizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 15/044,834

(22) Filed: Feb. 16, 2016

(65) Prior Publication Data
US 2016/0250753 A1 Sep. 1, 2016

(30) Foreign Application Priority Data
Feb. 26, 2015 (JP) ................... 2015-036691

(51) Int. Cl.
*B25J 15/04* (2006.01)
*B25J 19/00* (2006.01)

(52) U.S. Cl.
CPC .......... *B25J 15/0466* (2013.01); *B25J 15/04* (2013.01); *B25J 19/0025* (2013.01)

(58) Field of Classification Search
CPC .... B25J 15/0052; B25J 15/04; B25J 15/0466; B25J 15/0483; B25J 19/0025; G01R 31/04; G01R 31/043
See application file for complete search history.

(56) References Cited

U.S. PATENT DOCUMENTS

| | | | |
|---|---|---|---|
| 2007/0068025 A1* | 3/2007 | Harding | B23Q 5/043 33/561 |
| 2012/0292367 A1* | 11/2012 | Morgan | A61B 17/072 227/175.1 |
| 2015/0053741 A1* | 2/2015 | Shelton, IV | A61B 17/068 227/175.3 |
| 2015/0160361 A1* | 6/2015 | Gondo | B21D 5/02 324/679 |

FOREIGN PATENT DOCUMENTS

JP 2007-298288 A 11/2007

* cited by examiner

*Primary Examiner* — Spencer D Patton
(74) *Attorney, Agent, or Firm* — Fitzpatrick, Cella, Harper & Scinto

(57) ABSTRACT

The present invention provides a robot apparatus which can determine a contact state at a contact point without increasing the contact point, can be miniaturized, and also can decrease the cost. Contact points are provided in a hand device. Contact points are provided in a tool device, which come in contact with the contact points, respectively, when the tool device has been mounted on the hand device. A voltage detecting circuit is provided in the tool device, which detects a voltage between the contact points. The controlling circuit determines contact states between the contact points and the contact points, by using a value of the voltage which has been detected by the voltage detecting circuit.

19 Claims, 12 Drawing Sheets

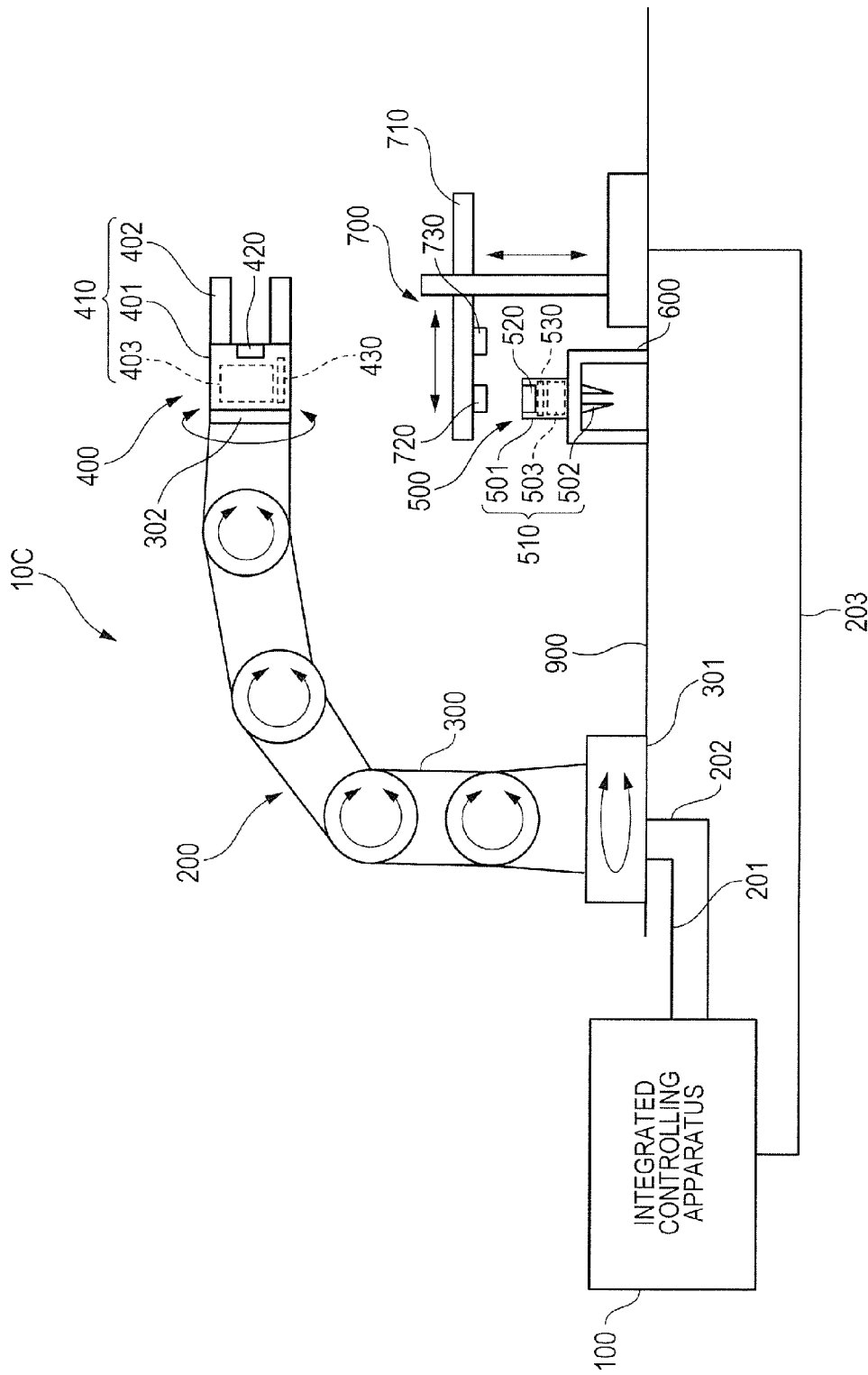

ROBOT APPARATUS

BACKGROUND OF THE INVENTION

Field of the Invention

The present invention relates to a robot apparatus in which a tool device is mounted on a hand device.

Description of the Related Art

Currently, a robot is applied to a manufacturing apparatus in a factory, and parts are transferred and/or assembled with the use of the robot. This type of robot is structured so as to have an electrically-operated robot hand (hand) attached to the head of a robot arm (arm) of a multi-axis and a multi-joint, or of a linearly moving arm.

One robot is needed to perform a plurality of operations for a limited production of a wide variety of products, and as a method therefor, the robot is occasionally made to grip in a hand an electrically-operated tool which can perform the operation that is hard to be performed by the hand, and makes the electrically-operated tool perform the operation. The tool is, for instance, a pincette tool which performs the transfer or the assembly for a small work or a thin work, or an absorbing chuck tool which absorbs and acquires a work.

An electric power can be supplied to and a signal can be a transmitted to the tool, if a contact point of the hand is electrically connected with a contact point of the tool when the hand grips the tool. The tool can be driven by the electric power and the signal which are thus supplied from the hand.

However, there has been a case where the sufficient electric power cannot be supplied and the signal cannot be transmitted because a contact resistance increases and a voltage drop becomes large in the connection portion between the contact point of the hand and the contact point of the tool, due to a contact failure, an aged deterioration and the like.

On the other hand, in order to avoid a stop of the apparatus due to the contact failure and the aged deterioration in the connection portion between the contact points, a method is proposed which detects the contact resistance between the contact points (Japanese Patent Application Laid-Open No. 2007-298288).

In the method disclosed in Japanese Patent Application Laid-Open No. 2007-298288, in order to measure the contact resistance between the contact point on a main body side and the contact point on a load side, a reference resistance is connected in series to the contact point on the main body side; the contact point for measurement is provided on the main body side and the contact point for measurement is provided on the load side, respectively; and the contact point and the contact point for the measurement are short-circuited on the load side. Then, a detecting unit arranged on the main body side detects a potential difference occurring in the reference resistance, and a potential difference occurring in a series circuit of the contact point in the main body side, the contact point in the load side, the contact point for the measurement in the load side and the contact point in the main body side; and grasps the contact resistance based on those detection results.

It is also considered to apply the configuration of Japanese Patent Application Laid-Open No. 2007-298288 to the robot apparatus having the hand and the tool, but the hand and the tool have each a plurality of contact points, and accordingly it has been necessary to increase the contact point for the measurement for each of the contact points, respectively. Then, there is a necessity of increasing the number of the contact points. Accordingly, the hand and the tool have been upsized and also the number of parts have increased, which have consequently caused increase in the cost.

SUMMARY OF THE INVENTION

An object of the present invention is to provide a robot apparatus which can determine a contact state at a contact point without increasing the contact point, to miniaturize the robot apparatus, and also to decrease the cost.

According to an aspect of the present invention, a robot apparatus comprises: a hand device; a hand side contact point which is provided in the hand device and to which a voltage is applied; a tool device which can be attached to and detached from the hand device; a tool side contact point which is provided in the tool device, and comes in contact with the hand side contact point as the tool device is mounted on the hand device; a tool side voltage detecting unit which is provided in the tool device, and detects a voltage of the tool side contact point; and a controlling unit which determines a contact state between the hand side contact point and the tool side contact point, by using a value of the voltage that has been detected by the tool side voltage detecting unit.

According to the present invention, the robot apparatus can determine the contact state at the contact point without increasing the number of the contact points, can be miniaturized, and can decrease the cost.

Further features of the present invention will become apparent from the following description of exemplary embodiments with reference to the attached drawings.

BRIEF DESCRIPTION OF THE DRAWINGS

FIG. 12 is an explanatory view illustrating a robot apparatus according to a fifth embodiment.

DESCRIPTION OF THE EMBODIMENTS

Preferred embodiments of the present invention will now be described in detail in accordance with the accompanying drawings.

First Embodiment

Figure 1:
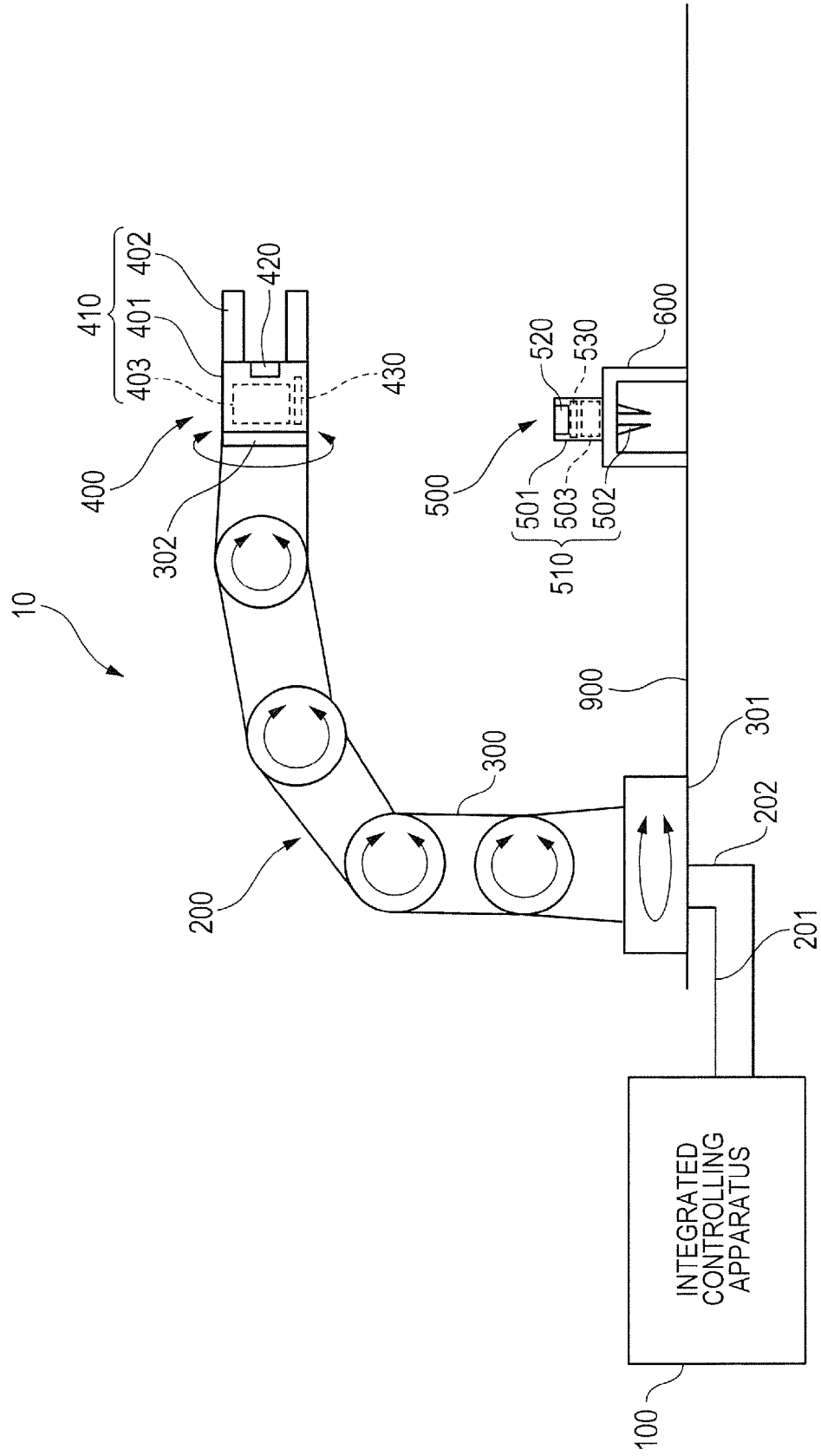
FIG. 1 is an explanatory view illustrating a robot apparatus according to a first embodiment.

FIG. 1 is an explanatory view illustrating a robot apparatus according to a first embodiment of the present invention. The robot apparatus 10 includes: a robot 200 having a robot arm (hereafter referred to as "arm") 300 and a robot hand (hereafter referred to as "hand") 400; a tool 500 which is attachable to and detachable from the hand 400; and an integrated controlling apparatus 100 which integrally controls these.

The arm 300 is an electrically-operated robot arm. The arm 300 is a vertical multi-joint robot arm, and is a robot arm which has six joints, specifically, a robot arm which has six axes. A proximal end 301 of the arm 300 is fixed to a trestle 900, and a head 302 of the arm 300 is a free end. The hand 400 is attached to the head 302 of the arm 300. A position and an orientation of the hand 400 can be changed by a rotation or a swing of each joint of the arm 300.

A tool storage site 600 which supports the tool 500 thereon that has been removed from the hand 400 is mounted on the trestle 900.

The hand 400 is an electrically-operated robot hand. The hand 400 includes: a hand device 410; a hand side contact unit 420 which has a plurality of contact points; and a control board 430 for controlling the hand device 410.

The hand device 410 includes: a base unit 401; a plurality of claws 402 which are supported by the base unit 401; and an electric motor (hereafter referred to as "motor") 403 which drives the plurality of claws 402 in an opening and closing direction (in radial direction with respect to base plane of base unit 401). The number of the claws 402 is set at two in the present embodiment, but the number is not limited to two, and may be three or more. When the opening and the closing of the plurality of claws 402 are driven, the plurality of claws 402 is enabled to grip or release the grip of the work or the tool 500.

The hand side contact unit 420 is provided in the hand device 410, specifically, in the base unit 401. A motor 403 is, for instance, a servo motor such as a brushless DC motor. The motor 403 and the control board 430 are provided in the inside of the base unit 401.

The tool 500 is the electrically-operated tool. The tool 500 includes: a tool device 510, a tool side contact unit 520 having a plurality of contact points; and a control board 530 for controlling the tool device 510.

The tool device 510 includes: a base unit 501; a plurality of claws 502 which are supported by the base unit 501; and an electric motor (hereafter referred to as "motor") 503 which drives the plurality of claws 502 in an opening and closing direction (in radial direction with respect to base plane of base unit 501). The number of the claws 502 is set at two in the present embodiment, but the number is not limited to two, and may be three or more. When the opening and the closing of the plurality of claws 502 are driven, the plurality of claws 502 is enabled to grip or release the grip of the work.

The tool side contact unit 520 is provided in the tool device 510, specifically, in the base unit 501. The motor 503 is, for instance, a servo motor such as a brushless DC motor. The motor 503 and the control board 530 are provided in the inside of the base unit 501.

The hand 400 (hand device 410) grips or releases the grip of the tool 500 (tool device 510), and thereby the tool 500 (tool device 510) results in being attached to and detached from the hand 400 (hand device 410). In other words, the tool device 510 is structured so as to be attachable to and detachable from the hand device 410.

The integrated controlling apparatus 100 and the arm 300 are connected by an arm wiring 201. The integrated controlling apparatus 100 controls each axis of the arm 300, by supplying an electric power and a signal to the arm 300 through the arm wiring 201.

The integrated controlling apparatus 100 and the hand 400 are connected by a hand wiring 202 which is arranged in the inside of the arm 300. The integrated controlling apparatus 100 controls the opening and closing of the claws 402 of the hand 400, by supplying the electric power and the signal to the hand 400 through the hand wiring 202.

The integrated controlling apparatus 100 moves the arm 300, and makes the hand 400 grip the tool 500 which is placed on the tool storage site 600. Thereby each contact point of the hand side contact unit 420 and each contact point of the tool side contact unit 520 come in contact with each other. The integrated controlling apparatus 100 controls the opening and closing of the claws 502 of the tool 500, by supplying the electric power and the signal to the tool 500 through the hand 400 (hand wiring 202).

The tool 500 has a role of performing an operation which is difficult for the hand 400. The tool is, for instance, the pincette tool which performs the transfer or the assembly of a small work or a thin work, and the absorbing chuck tool which absorbs and acquires the work. In the first embodiment, the case will be described where the tool 500 is the pincette tool.

Figure 2:
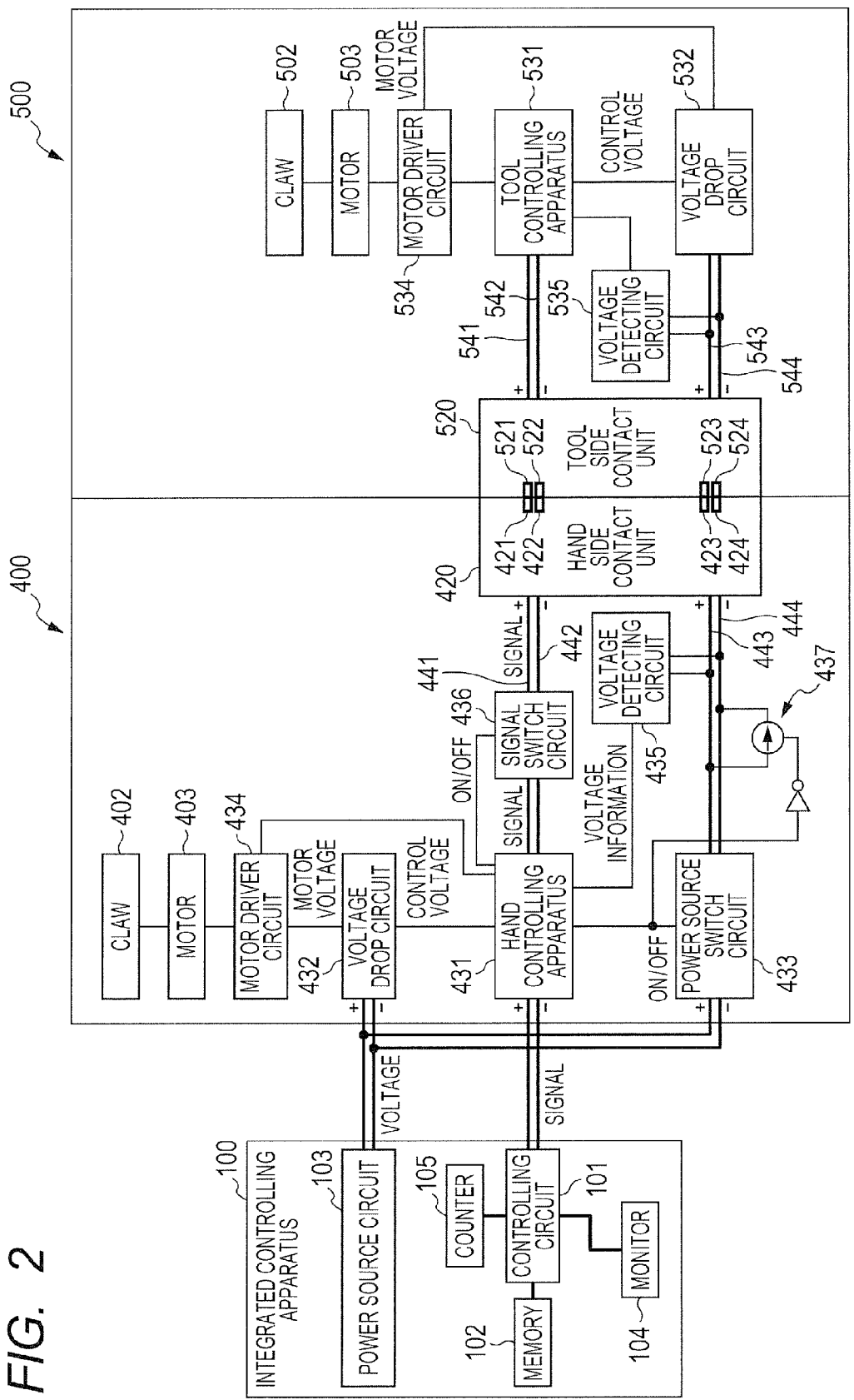
FIG. 2 is a block diagram illustrating an integrated controlling apparatus, a hand and a tool of the robot apparatus according to the first embodiment.

FIG. 2 is a block diagram illustrating the integrated controlling apparatus, the hand and the tool of the robot apparatus according to the first embodiment of the present invention. In FIG. 2, a state is illustrated in which the tool 500 (tool device 510) has been mounted on the hand 400 (hand device 410), specifically, a state in which the tool 500 is gripped by the hand 400.

The integrated controlling apparatus 100 includes: a controlling circuit 101 which integrally controls the whole robot apparatus as a controlling unit; a memory 102 which stores various data (information) therein, as a memory unit; and a power source circuit 103 for supplying an electric power to the whole robot apparatus therefrom, as a power source unit. The integrated controlling apparatus 100 also includes: a monitor 104 which displays an image thereon according to instructions of the controlling circuit 101, as an annunciation unit; and a counter 105 which counts the number of times the tool device 510 has been mounted on the hand device 410.

In response to an input, for instance, of a commercial power source, the power source circuit 103 outputs a fixed direct-current voltage (for instance, 24 [V]). Incidentally, the case will be described below where the power source unit is the power source circuit 103, but the power source unit may be a battery.

The control board 430 (refer to FIG. 1) of the hand 400 includes: a hand controlling apparatus 431 which is a hand controlling unit; a voltage drop circuit 432; a power switch circuit 433; a motor driver circuit 434; a voltage detecting circuit 435; a signal switch circuit 436; and a discharge circuit 437, which are illustrated in FIG. 2. The control board 530 (refer to FIG. 1) of the tool 500 includes: a tool controlling apparatus 531 which is a tool controlling unit; a voltage drop circuit 532; a motor driver circuit 534; and a voltage detecting circuit 535, which are illustrated in FIG. 2.

The hand side contact unit 420 has a plurality of contact points 421 to 424 (four in first embodiment). The tool side contact unit 520 has a plurality of contact points 521 to 524 (four in first embodiment). Each of the contact points 421 to 424 comes in contact with each of the corresponding contact points 521 to 524, when the tool device 510 has been mounted on the hand device 410. Thereby, continuity is formed between each of the contact points 421 to 424 and each of the contact point 521 to 524.

The power source circuit 103 of the integrated controlling apparatus 100 and the voltage drop circuit 432 of the hand 400 are connected by two power source wires. In addition, the power source circuit 103 and the contact points (hand side contact point) 423 and 424 of the hand side contact unit 420 are connected by two power source wires 443 and 444 through the power switch circuit 433. In other words, the power source wires 443 and 444 are electrically connected to the contact points 423 and 424 of the hand side contact unit 420, respectively.

The controlling circuit 101 and the hand controlling apparatus 431 of the integrated controlling apparatus 100 are connected by two signal wires. Thereby, the controlling circuit 101 and the hand controlling apparatus 431 can mutually send and receive signals (communicate) through the signal wires.

The hand controlling apparatus 431 and the contact points (hand side signal contact point) 441 and 442 of the hand side contact unit 420 are connected by two signal wires 441 and 442 through the signal switch circuit 436. In other words, the signal wires 441 and 442 are electrically connected to the contact points 421 and 422 of the hand side contact unit 420, respectively.

The contact points (tool side contact point) 523 and 524 of the tool side contact unit 520 and the voltage drop circuit 532 are connected by two power source wires 543 and 544. In other words, the power source wires 543 and 544 are electrically connected to the contact points 523 and 524 of the tool side contact unit 520, respectively.

In addition, the contact points (tool side signal contact points) 521 and 522 of the tool side contact unit 520 and the tool controlling apparatus 531 are connected by two signal wires 541 and 542. As for the detailed description, the signal wires 541 and 542 are electrically connected to the contact points 521 and 522 of the tool side contact unit 520, respectively.

In the first embodiment, a power source potential (for instance, +24 [V]) is applied to one of the two power source wires, and a ground potential (for instance, 0 [V]) is applied to the other power source wire. In addition, two signals are supplied to two signal wires. One of the two signals, which will become a positive side (+), is supplied to one signal wire of the two signal wires, and the other signal which will become the negative side (−) is supplied to the other signal wire. The difference between the two signals becomes a differential signal.

The voltage drop circuit 432 of the hand 400 drops a direct-current voltage applied by the power source circuit 103 to a control voltage which is used for an operation of the hand controlling apparatus 431, and applies the control voltage to the hand controlling apparatus 431. In addition, the voltage drop circuit 432 drops a direct-current voltage applied by the power source circuit 103 to a motor voltage which is used for an operation of the motor driver circuit 434, and applies the motor voltage to the motor driver circuit 434.

The hand controlling apparatus 431 controls an operation of the hand device 410, specifically, of the claws 402 (or motor 403), in response to an input of an operation signal sent from the controlling circuit 101.

Specifically, the hand controlling apparatus 431 which has received the input of operation signal outputs a control signal to the motor driver circuit 434 to control the motor driver circuit 434. The motor driver circuit 434 modulates the pulse width of the motor voltage applied by the voltage drop circuit 432 according to the control signal, and applies the modulated voltage to the motor 403. Thus, the power source circuit 103 supplies an electric power which is necessary for the rotation of the motor 403, to the motor 403, and the hand controlling apparatus 431 controls the rotation of the motor 403. The motor 403 is connected to the claws 402, and the claws 402 open and close according to the rotation of the motor 403.

An encoder (unillustrated) is connected to the motor 403, which enables a positional control, and a speed control based on a difference value between the positions. In addition, a motor current detecting circuit (unillustrated) which detects a current value of the motor 403 is provided in the hand device 410, and enables the current control of the motor 403.

The hand controlling apparatus 431 outputs the control signal to the power switch circuit 433, and controls ON and OFF of the power switch circuit 433. Specifically, the power switch circuit 433 controls the supply/non-supply of the electric power to the contact points 423 and 424, in other words, the supply/non-supply of the electric power to the tool 500, according to the control signal.

The hand controlling apparatus 431 outputs a control signal to the signal switch circuit 436, and controls ON and OFF of the signal switch circuit 436. Specifically, the signal switch circuit 436 controls the supply/non-supply of the signal to the contact points 421 and 422, in other words, the supply/non-supply of the signal to the tool 500, according to the control signal.

When operating the hand 400 (hand device 410), the hand controlling apparatus 431 controls both of the power switch circuit 433 and the signal switch circuit 436 to turn the switches OFF, and intercepts the electric power and the signal being supplied to the tool 500.

Thereby, the hand controlling apparatus 431 operates the motor driver circuit 434, according to an operation signal which has been input from the controlling circuit 101 and the hand controlling apparatus 431 has received, and controls the rotation of the motor 403. Thereby, the hand controlling apparatus 431 controls an operation of the hand device 410 (claws 402).

When the hand 400 has gripped the tool 500, in other words, when the tool device 510 has been mounted on the hand device 410, each of the contact points 421 to 424 of the hand side contact unit 420 comes in contact with each of the contact points 521 to 524 of the tool side contact unit 520. After that, the power switch circuit 433 is turned ON by the hand controlling apparatus 431, and an electric power is supplied to the voltage drop circuit 532 of the tool 500.

A direct-current voltage is applied to the voltage drop circuit 532 by the power source circuit 103, through the power source wires 443 and 444, the contact points 423 and 424, the contact points 523 and 524, and the power source wires 543 and 544. The voltage drop circuit 532 drops the direct-current voltage which has been applied by the power source circuit 103 to a control voltage which is used for an operation of the tool controlling apparatus 531, and applies the control voltage to the tool controlling apparatus 531.

In addition, the voltage drop circuit 532 drops a direct-current voltage applied by the power source circuit 103 to a motor voltage which is used for an operation of the motor driver circuit 534, and applies the motor voltage to the motor driver circuit 534.

The hand controlling apparatus 431 controls the signal switch circuit 436 to turn the switch ON, after the electric power has been supplied. Thereby, the hand controlling apparatus 431 and the tool controlling apparatus 531 are enabled to mutually send and receive signals (communicate). The tool controlling apparatus 531 controls an operation of the tool device 510, specifically, the claws 502 (specifically motor 503), in response to the input of an operation signal sent from the controlling circuit 101 through the hand controlling apparatus 431.

Specifically, the tool controlling apparatus 531 which has received the input of operation signal outputs a control signal to the motor driver circuit 534 to control the motor driver circuit 534. The motor driver circuit 534 modulates the pulse width of the motor voltage applied by the voltage drop circuit 532 according to the control signal, and applies the modulated voltage to the motor 503. Thus, the power source circuit 103 supplies an electric power which is necessary for the rotation of the motor 503, to the motor 503, and the tool controlling apparatus 531 controls the rotation of the motor 503. The motor 503 is connected to the claws 502, and the claws 502 open and close according to the rotation of the motor 503.

Here, suppose that the electric power is always supplied to the contact points 423 and 424 in the hand side contact unit 420. When the contact points 423 and 424 come in contact with the contact points 523 and 524 in the tool side contact unit 520, a deterioration phenomenon such as an arc discharge occurs in the contact points. Similarly, suppose that the signals are always supplied to the contact points 421 and 422 in the hand side contact unit 420. When the contact points 421 and 422 come in contact with the contact points 521 and 522 in the tool side contact unit 520, the deterioration phenomenon such as the arc discharge occurs in the contact points.

In contrast to this, in the first embodiment, the hand 400 has the power switch circuit 433 and the signal switch circuit 436. When the hand 400 grips the tool 500, in other words, when the tool device 510 is mounted on the hand device 410, each of the switching circuits 433 and 436 are turned OFF. Thereby, the deterioration of each of the contact points in each of the contact units 420 and 520 can be suppressed. In addition, such a phenomenon can be prevented that when a work, a jig or the like has come in contact with the hand side contact unit 420, an electric current flows to the work or the jig.

An encoder (unillustrated) is connected to the motor 503, which enables a positional control, and a speed control based on a difference value between the positions. In addition, a motor current detecting circuit (unillustrated) which detects a current value of the motor 503 is provided in the tool device 510, and enables the current control of the motor 503.

The voltage detecting circuit 435 which is the hand side voltage detecting unit is provided in the hand device 410, and the voltage detecting circuit 535 which is the tool side voltage detecting unit is provided in the tool device 510.

The degree of deterioration with the passage of time of each of the contact points in each of the contact units 420 and 520 is almost the same as the others, and accordingly in the first embodiment, a contact state between the contact points 423 and 424 in the hand side contact unit 420 and the contact points 523 and 524 in the tool side contact unit 520 are determined.

Because of this, in the first embodiment, the voltage detecting circuit 435 detects voltage (potential difference) between the two contact points 423 and 424. Specifically, the voltage detecting circuit 435 detects the voltage between an arbitrary point (detecting point) of the power source wire 443 and an arbitrary point (detecting point) of the power source wire 444. Each of the detecting points is preferably close to each of the contact points 423 and 424, in consideration of also the voltage drop due to wiring resistance in each of the power source wires 443 and 444. In the first embodiment, the contact point 423 becomes a power source potential, and the contact point 424 becomes a ground potential; and accordingly, the voltage detecting circuit 435 detects the voltage of the contact point 423 relative to the contact point 424.

The voltage information (signal which shows value of voltage) which has been detected by the voltage detecting circuit 435 is output to the controlling circuit 101 of the integrated controlling apparatus 100, through the hand controlling apparatus 431.

The voltage detecting circuit 535 detects voltage (potential difference) between the two contact points 523 and 524. Specifically, the voltage detecting circuit 535 detects the voltage between an arbitrary point (detecting point) of the power source wire 543 and an arbitrary point (detecting point) of the power source wire 544. Each of the detecting points is preferably close to each of the contact points 523 and 524, in consideration of also the voltage drop due to wiring resistances in each of the power source wires 543 and 544. In the first embodiment, the contact point 523 becomes the power source potential, and the contact point 524 becomes the ground potential; and accordingly, the voltage detecting circuit 535 detects the voltage of the contact point 523 relative to the contact point 524.

The voltage information (signal which shows value of voltage) which has been detected by the voltage detecting circuit 535 is output to the controlling circuit 101 of the integrated controlling apparatus 100, through the tool controlling apparatus 531, the contact points 521 and 522, the contact points 421 and 422, and the hand controlling apparatus 431.

Thus, the controlling circuit 101 of the integrated controlling apparatus 100 acquires the value of voltage which has been detected by the voltage detecting circuit 435, and the value of voltage which has been detected by the voltage detecting circuit 535.

Figure 3:
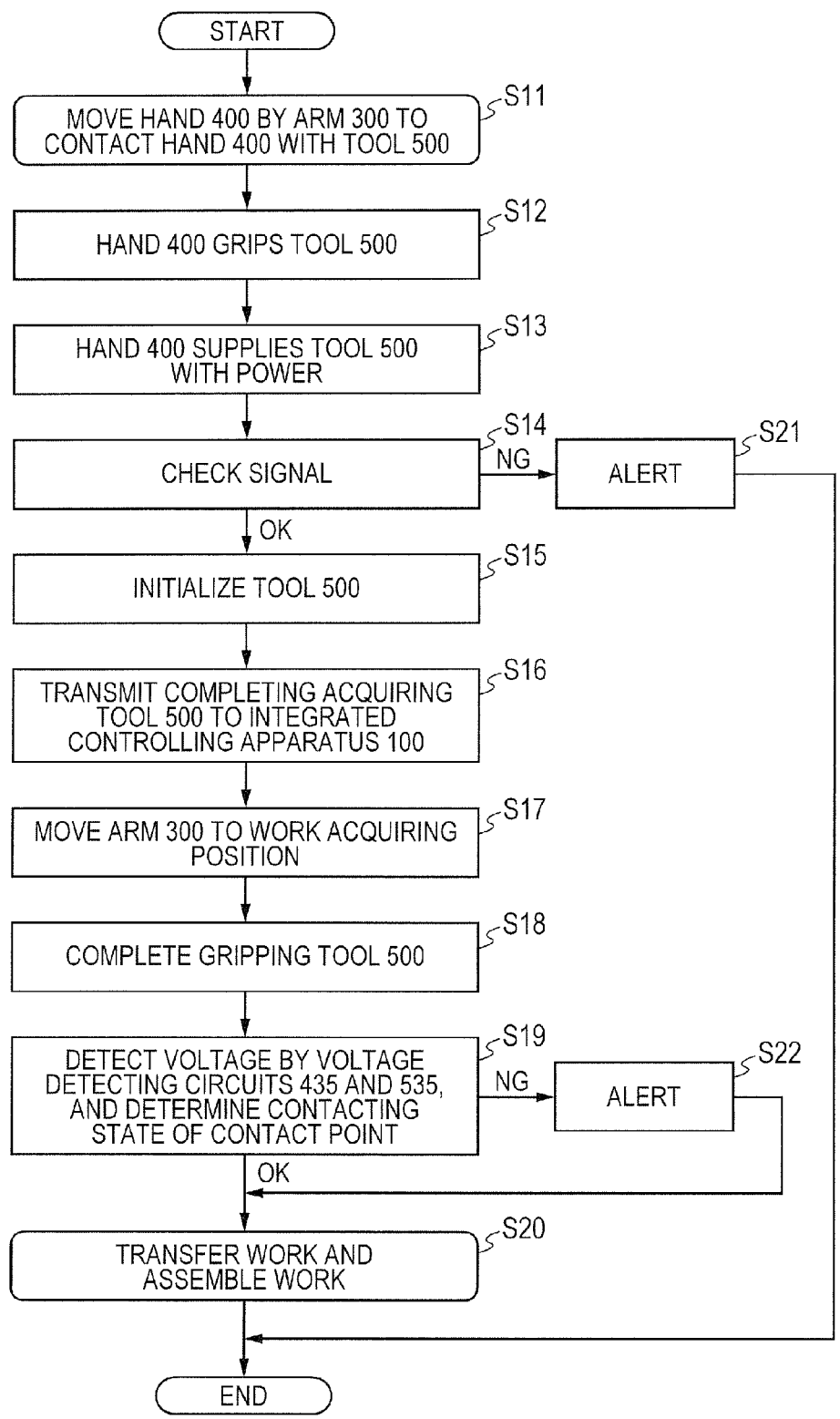
FIG. 3 is a flow chart which is used when a contact state of a contact point is determined, in the robot apparatus according to the first embodiment.

FIG. 3 is a flow chart which is used when the contact state among the contact points is determined, in the robot apparatus according to the first embodiment of the present invention. In FIG. 3, the contact state among the contact points is determined at the time of the initialization which is performed after the hand 400 has acquired the tool 500.

First, the controlling circuit 101 of the integrated controlling apparatus 100 controls the arm 300 to operate the arm 300 to a position at which the hand 400 contacts the tool 500 (S11). Thereby, the controlling circuit 101 makes the arm 300 move the hand 400, and makes the hand 400 come in contact with the tool 500.

After that, the controlling circuit 101 makes the hand 400 grip the tool 500 (S12). Specifically, the controlling circuit 101 transmits the operation signal to the hand controlling apparatus 431 of the hand 400 so as to move a plurality of claws 402 to such a direction that the claws 402 are closed. The hand controlling apparatus 431 makes the motor 403 rotate according to the operation signal, thereby makes the plurality of claws 402 move to such a direction that the claws 402 are closed, and makes the hand 400 grip the tool 500.

After the hand 400 has completed gripping, the hand 400 supplies an electric power to the tool 500 (S13). Specifically, the controlling circuit 101 transmits such an instruction as to turn the switches ON of the power switch circuit 433 and the signal switch circuit 436, to the hand controlling apparatus 431. The hand controlling apparatus 431 which has received the instruction sequentially turns the switches ON of the power switch circuit 433 and the signal switch circuit 436. Thereby, an electric power is enabled to be supplied from the hand 400 to the tool 500, and the hand controlling apparatus 431 and the tool controlling apparatus 531 become a state of being capable of transmitting and receiving the signal to and from each other.

Next, after the signal switch circuit 436 has been turned ON, it is checked whether or not the hand controlling apparatus 431 and the tool controlling apparatus 531 can exchange signals mutually (check signal) (S14). In other words, it is checked whether or not the hand controlling apparatus 431 and the tool controlling apparatus 531 can communicate with each other. Specifically, the hand controlling apparatus 431 transmits a check signal to the tool controlling apparatus 531, and checks whether or not having received a response signal to this check signal from the tool controlling apparatus 531.

In a normal case, there is a reply from the tool controlling apparatus 531 to the hand controlling apparatus 431. In a case where there is abnormality, there is no reply from the tool controlling apparatus 531. In other words, if the apparatuses can communicate with each other, there is the reply (response) from the tool controlling apparatus 531, and the tool 500 is initialized (S15). The initialization of the tool 500 means a position alignment of the motor 503 with the claws 502, and a prior operation necessary for using the tool 500, such as a Z-phase detection of the encoder (unillustrated) of the motor 503.

In the case where there is no reply from the tool controlling apparatus 531 even though a fixed time period has passed in the signal check in the step S14, the hand controlling apparatus 431 transmits a signal which shows an error, to the controlling circuit 101 of the integrated controlling apparatus 100. Then, the controlling circuit 101 which has received the signal which shows the error emits an alert to a user (S21). Specifically, the controlling circuit 101 makes a monitor 104 display an image thereon which shows the alert. Incidentally, the annunciation unit which sends the notice to the user is determined to be the monitor 104, but is not limited to the monitor. The annunciation unit may be an unillustrated loudspeaker, for instance, and may make the loudspeaker output a sound which shows the alert.

The phenomenon that the tool controlling apparatus 531 does not respond occurs because the hand side contact unit 420 and the tool side contact unit 520 are not connected normally, or because the contacting portions of the contact points deteriorate and/or catch contaminants therebetween, and the contact resistance value exceeds a limit value. By receiving the alert, the user can maintain the contacting portions.

After the tool 500 has been initialized, the tool 500 is in a state of being capable of being used. Accordingly, the hand controlling apparatus 431 transmits a signal which shows that the hand has completed the acquisition of the tool 500, to the controlling circuit 101 of the integrated controlling apparatus 100 (S16).

The controlling circuit 101 controls the operation of the arm 300 to thereby make the arm 300 move the tool 500 to a work acquisition position (S17). The controlling circuit 101 makes the arm 300 operate and thereby move the tool 500 to the work acquisition position.

The controlling circuit 101 transmits an instruction to the tool controlling apparatus 531, the tool controlling apparatus 531 controls the current flowing in the motor 503, and thereby operates the claws 502 until the tool 500 completes gripping the work (S18). As for the completion of the gripping operation, a contact sensor (unillustrated) may be provided on the claw 502, and the tool controlling apparatus 531 may determine whether or not the gripping operation has been completed, based on the detection result of the contact sensor (unillustrated). Alternatively, the tool controlling apparatus 531 may determine whether or not the gripping operation has been completed, based on a displacement between the values of the encoder (unillustrated) of the motor 503.

Next, the controlling circuit 101 of the integrated controlling apparatus 100 acquires the value of the voltage (potential difference) from the voltage detecting circuits 435 and 535 at predetermined sampling intervals, and determines the contact states between the contact points 423 and 424 and the contact points 523 and 524 by using these detection results (S19).

The time period for sampling data is, for instance, 2 [ms]. It is acceptable to use one data for the determination of the contact state, or it is also acceptable to average a plurality of data (for instance, ten data) and use the average for the determination.

The controlling circuit 101 issues an alert to the user, when having determined that the contact state is NG in the step S19 (S22). Specifically, the controlling circuit 101 makes the monitor 104 display an image thereon which shows the alert. Incidentally, the annunciation unit which sends the notice to a user is determined to be the monitor 104, but is not limited to the monitor. The annunciation unit may be an unillustrated loudspeaker, for instance, and may make the loudspeaker output a sound which shows the alert.

When having determined that the contact state is OK in the step S19, or having issued the alert in the step S22, the controlling circuit 101 makes the robot 200 carry out operations of the transfer of the work, the assembly of the work and the like (S20).

A method for determining the contact state between the contact points will be described below in detail. In the first embodiment, the voltage detecting circuit 435 detects a potential difference between the contact points 423 and 424, specifically, a potential difference between a plus side power source potential which has been applied to the contact point 423 and a minus side power source potential (ground potential) which has been applied to the contact point 424. In addition, the voltage detecting circuit 535 detects a potential difference between the contact points 523 and 524, specifically, a potential difference between a plus side power source potential which has been applied to the contact point 523 and a minus side power source potential (ground potential) which has been applied to the contact point 524.

The tool controlling apparatus 531 does not operate, unless the electric power and the signal are supplied from the hand controlling apparatus 431. Because of this, the controlling apparatus 531 can determine the contact state of the contact points only when the electric power and the signal are supplied to the tool 500 side from the hand 400 side.

The controlling circuit 101 acquires the value of the voltage which has been detected by the voltage detecting circuit 435 and the value of the voltage which has been detected by the voltage detecting circuit 535, and determines the contact states between the contact points 423 and 424 and the contact points 523 and 524, by using the detection results.

The above description will be specifically described below. When determining the contact state, the controlling circuit 101 determines whether or not the difference value between the value of the voltage which has been detected by the voltage detecting circuit 435 and the value of the voltage which has been detected by the voltage detecting circuit 535 has exceeded a threshold value (threshold value of voltage) which has been set beforehand. If the difference value exceeds the threshold value, the contact state is NG, and if the difference value does not exceed the threshold value, the contact state is OK. Here, the threshold value is a value which is stored beforehand in the memory 102 in FIG. 2.

Figure 4:
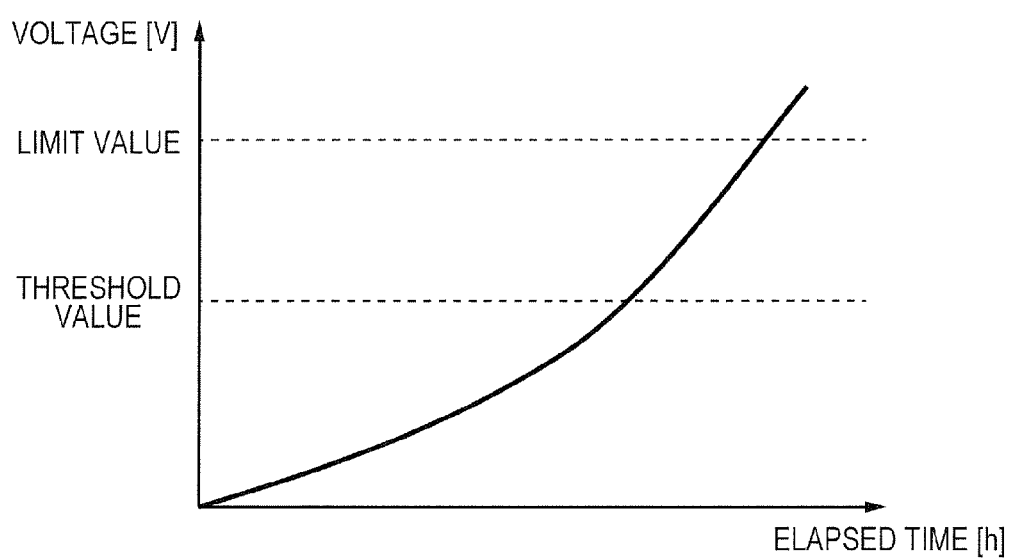
FIG. 4 is a schematic diagram illustrating a relation between an elapsed time and a difference value between voltages, in the first embodiment.

FIG. 4 is a schematic diagram illustrating a relation between an elapsed time and the difference value between the voltages. As is illustrated in FIG. 4, the contact points in each of the contact units 420 and 520 deteriorate with the passage of time if being not maintained, the contact resistance between the contact points increases, and accordingly the voltage drop increases which occurs in the connection portion between the contact points. Accordingly, the controlling circuit 101 determines whether or not such a difference value that the value of the voltage which has been detected by the voltage detecting circuit 535 has been subtracted from the value of the voltage which has been detected by the voltage detecting circuit 435 has exceeded the threshold value (threshold value of voltage). Here, in FIG. 4, in addition to the threshold value, a limit value is illustrated which is larger than the threshold value. The limit value is a value at which the tool becomes incapable of receiving the electric power or the signal, and the threshold value is preferably set at a value lower than the limit value.

When the difference value has exceeded the threshold value, the controlling circuit 101 only issues the alert for calling such an attention that the user needs to maintain the contact points, for instance, by cleaning and the like (S22), and does not make the robot 200 stop the operation. However, in the case of NG in the step S14, the tool cannot receive the signal, and accordingly the difference value must exceed the limit value. Accordingly, the controlling circuit 101 issues the alert which shows an error in the step S21, and also makes the robot 200 stop the operation.

For instance, suppose that the threshold value has been set at 2 [V]. In the case where 24 [V], for instance, has been detected by the voltage detecting circuit 435, and 21 [V], for instance, has been detected by the voltage detecting circuit 535, the controlling circuit 101 calculates a difference value (24 [V]−21 [V]=3 [V]), and determines whether or not this calculation result has exceeded the threshold value 2 [V]. In this case, the difference value exceeds the threshold value (3 [V]>2 [V]), and the controlling circuit 101 issues the alert by the monitor 104.

Incidentally, on the contrary, in the case where the voltage value which has been detected by the voltage detecting circuit 435 is subtracted from the voltage value which has been detected by the voltage detecting circuit 535, the difference value becomes a minus value and the threshold value may be set at the value of a minus. Then, the controlling circuit 101 may determine whether or not the difference value has exceeded the threshold value to a minus direction.

Figure 5:
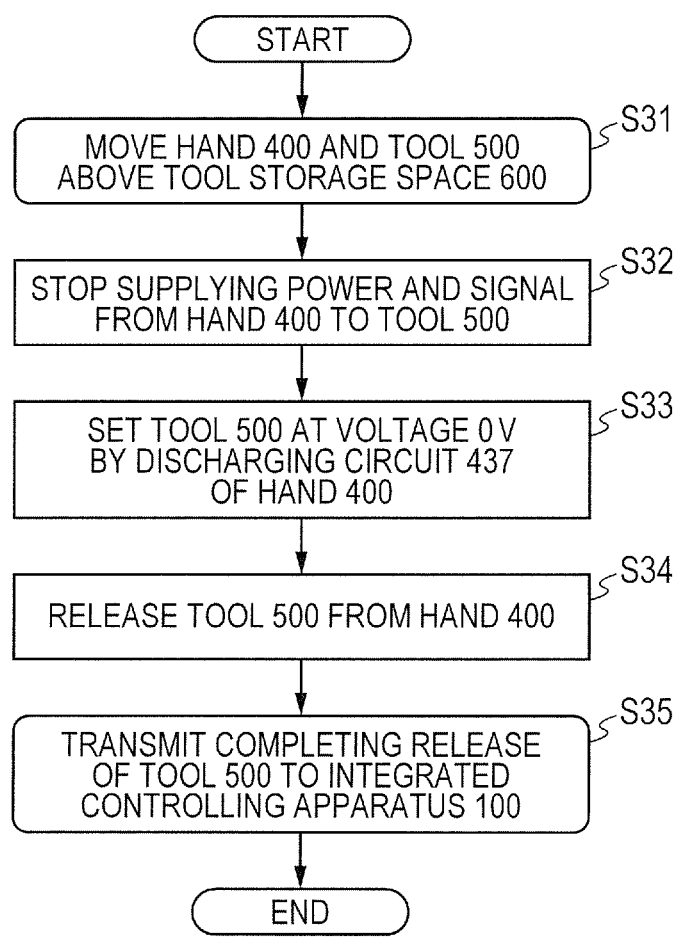
FIG. 5 is a flow chart illustrating the time at which the tool is released, in the robot apparatus according to the first embodiment.

FIG. 5 is a flow chart illustrating the time at which the tool is released, in the robot apparatus according to the first embodiment of the present invention.

Firstly, the integrated controlling apparatus 100 makes the arm 300 operate to make the hand 400 and the tool 500 move to the upside of the tool storage site 600 (S31). After that, the integrated controlling apparatus 100 makes the hand 400 stop supplying the electric power and the signal from the hand 400 side to the tool 500 side (S32).

At the same time when processing the step S32, the integrated controlling apparatus 100 makes the discharge circuit 437 of the hand 400 set the potential of the tool 500 at 0 [V] (S33).

By the setting of the potential of the tool 500 at 0 [V], such a phenomenon can be prevented from occurring that the contact points deteriorate due to an arc discharge and the like, when the tool 500 leaves from the hand 400. In addition, the potential of the tool 500 can be more early set at 0 [V] by the discharge circuit 437, and a time period to be spent before the tool 500 is released can be shortened.

After the step S33, the hand 400 releases the tool 500 (S34), and the tool controlling apparatus 531 transmits a signal which shows that an operation of releasing the tool has been completed, to the integrated controlling apparatus 100 (S35).

As has been described above, the robot apparatus according to the first embodiment determines the contact states between the contact points 423 and 424 and the contact points 523 and 524, by using the value of the voltage which has been detected by the voltage detecting circuit 535 that has been provided in the tool device 510, and accordingly does not need to increase the number of contact points for the voltage detection. Accordingly, the robot apparatus can miniaturize the hand side contact unit 420 and the tool side contact unit 520, accordingly can miniaturize the hand 400 and the tool 500, does not need to add the contact point for the voltage detection, and accordingly can reduce the cost of the hand 400 and the tool 500.

In addition, the robot apparatus according to the first embodiment transmits the data (signal) which shows the value of the voltage that has been detected by the voltage detecting circuit 535, to the controlling circuit 101, through the transmission path of the operation signal which operates the tool device 510, specifically through the contact points 521 and 522 and the contact points 421 and 422. Accordingly, the robot apparatus does not need to add a contact point for transmitting a signal which shows the voltage value that has been detected by the voltage detecting circuit 535. Therefore, the robot apparatus can miniaturize the hand side contact unit 420 and the tool side contact unit 520, accordingly can miniaturize the hand 400 and the tool 500, does not need to add the contact point for the voltage detection, and accordingly can reduce the cost of the hand 400 and the tool 500.

In the first embodiment, the integrated controlling apparatus 100 has the counter 105 (FIG. 2) which counts the number of times the hand 400 has acquired the tool 500, specifically, the number of times the tool device 510 has been mounted on the hand device 410. The counted value by the counter 105 is reset when a user has performed maintenance.

A threshold value (threshold value for count) is set beforehand so that the controlling circuit 101 distinguishes whether or not the deterioration of the contact point can be restored by the maintenance. In other words, the threshold value for the count is stored in the memory 102 beforehand. The controlling circuit 101 determines whether or not the counted value by the counter 105 at the time when the difference value has exceeded the threshold value is smaller than the threshold value for the count. Then, when having determined that the counted value is smaller than the threshold value for the count, the controlling circuit 101 makes the monitor 104 display the image showing the notice thereon. Thereby, the user can grasp that the time has come to replace the contact point.

Second Embodiment

Figure 6:
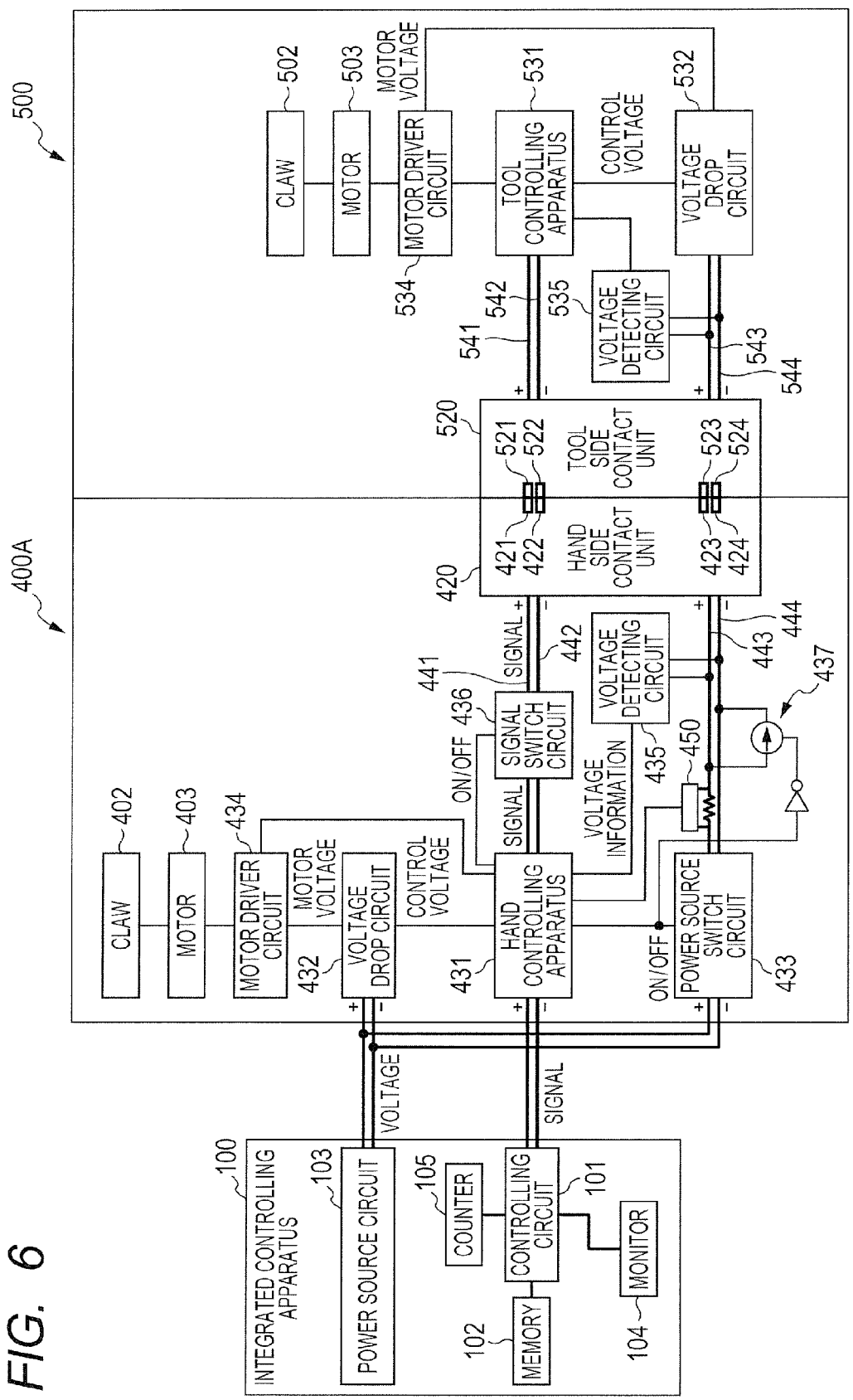
FIG. 6 is a block diagram illustrating an integrated controlling apparatus, a hand and a tool of a robot apparatus according to a second embodiment.

Next, a robot apparatus according to a second embodiment of the present invention will be described. FIG. 6 is a block diagram illustrating an integrated controlling apparatus, a hand and a tool of the robot apparatus according to the second embodiment of the present invention. The configuration of the robot apparatus in the second embodiment is different from that in the first embodiment in the point that the robot apparatus in the second embodiment has a current detecting circuit 450 therein, but except for the point, is similar to the configuration in the first embodiment. Therefore, in the second embodiment, the configurations similar to those in the first embodiment are designated by the same reference numerals, and the description will be omitted.

The robot apparatus of the second embodiment has further the current detecting circuit 450 which functions as a current detecting unit that detects an electric current which passes through the contact point 423 of the hand side contact unit 420.

Here, the electric current which passes through the contact point 423 is the same as an electric current which passes the power source wire 443, the contact point 523 of the tool side contact unit 520, and the power source wire 543. Furthermore, also through the power source wire, the contact point, the contact point and the power source wire all in the ground side, which form a return path of the direct current, the electric current flows which is almost same as the electric current that passes through the outward path of the direct current, specifically, the electric current which passes through the contact point 423.

Accordingly, in the second embodiment, the current detecting circuit 450 is provided in the power source wire 443 so as to easily detect the electric current and also easily transmit a detection result to the controlling circuit 101, and is configured to detect the electric current which passes through the power source wire 443. In other words, in the second embodiment, the hand 400A has the current detecting circuit 450. This current detecting circuit 450 may be provided in the power source wire 444 therein.

Incidentally, the tool 500 may have the current detecting circuit 450 therein. In this case, the current detecting circuit 450 may detect an electric current which passes through the power source wire 543 or the power source wire 544. In addition, the current detecting circuit 450 may be provided in between the power source circuit 103 and the power switch circuit 433. In this case, the integrated controlling apparatus 100 may have the current detecting circuit 450 therein.

Information on the electric current (signal which shows the value of electric current) which has been detected by the current detecting circuit 450 is output to the controlling circuit 101 of the integrated controlling apparatus 100, through the hand controlling apparatus 431.

Figure 7:
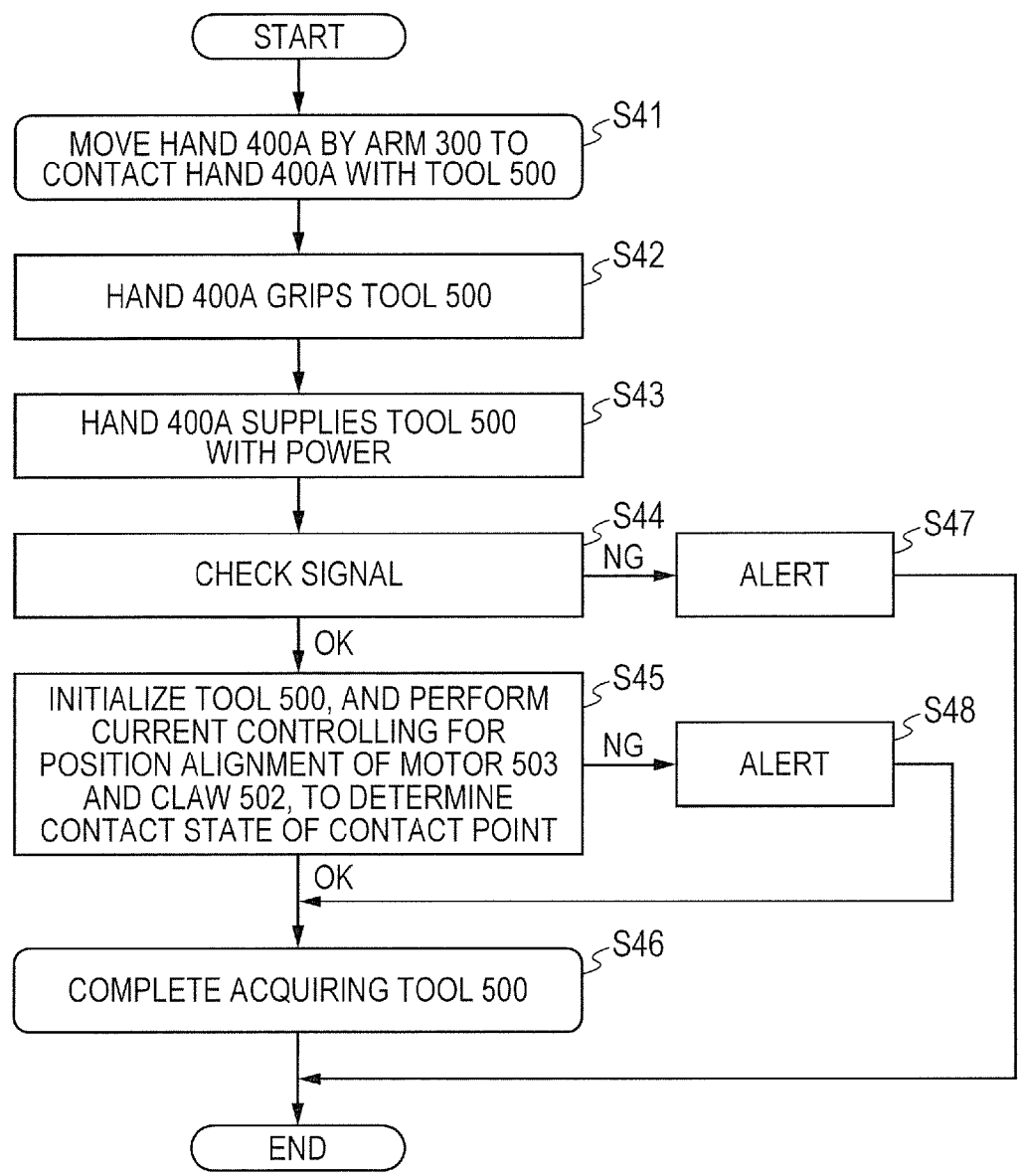
FIG. 7 is a flow chart which is used when a contact state of a contact point is determined, in the robot apparatus according to the second embodiment.

FIG. 7 is a flow chart which is used when the contact state between the contact points is determined, in the robot apparatus according to the second embodiment of the present invention. In FIG. 7, the contact state among the contact points is determined at the time of the initialization which is performed after the hand 400A has acquired the tool 500. The steps S41 to S44 and the step S47 are the same as the steps S11 to S14 and the step S21 in FIG. 3, and accordingly the description will be omitted.

When the tool 500 is initialized, the position of the claws 502 are aligned with that of the motor 503, but the position alignment is performed by a current control of the motor 503. After a butting operation of the claws 502 has been completed, the controlling circuit 101 determines the contact states between the contact points 423 and 424 and the contact points 523 and 524, by using the values of the voltages which have been detected by the voltage detecting circuit 435 and 535, and the value of the electric current which has been detected by the current detecting circuit 450 (S45).

The controlling circuit 101 issues an alert to the user, when having determined that the contact state is NG in the step S45 (S48). Specifically, the controlling circuit 101 makes the monitor 104 display an image thereon which shows the alert. Incidentally, the annunciation unit which sends the notice to the user is determined to be the monitor 104, but is not limited to the monitor. The annunciation unit may be an unillustrated loudspeaker, for instance, and may make the loudspeaker output a sound which shows the alert.

When the controlling circuit 101 has determined that the contact state is OK in the step S45, or has issued the alert in the step S48, an acquisition of the tool 500 is completed (S46).

When determining the contact state in the step S45, the controlling circuit 101 determines an electric resistance value, from the difference value between the value of the voltage which has been detected by the voltage detecting circuit 435 and the value of the voltage which has been detected by the voltage detecting circuit 535, and the value of the electric current which has been detected by the current detecting circuit 450.

The difference value between the voltages is values of voltages which have dropped in between the contact points 423 and 424 and the contact point 523 and 524. Accordingly, an electric resistance value, in other words, a contact resistance value, can be determined from Ohm's law, by using the difference value between the voltages and the value of the electric current. Then, the controlling circuit 101 determines whether or not the contact resistance value has exceeded the threshold value (threshold value of resistance) which has been set beforehand. If the contact resistance value exceeds the threshold value, the contact state is NG, and if the contact resistance value does not exceed the threshold value, the contact state is OK. Here, the threshold value is a value which is stored beforehand in the memory 102 in FIG. 6.

Figure 8:
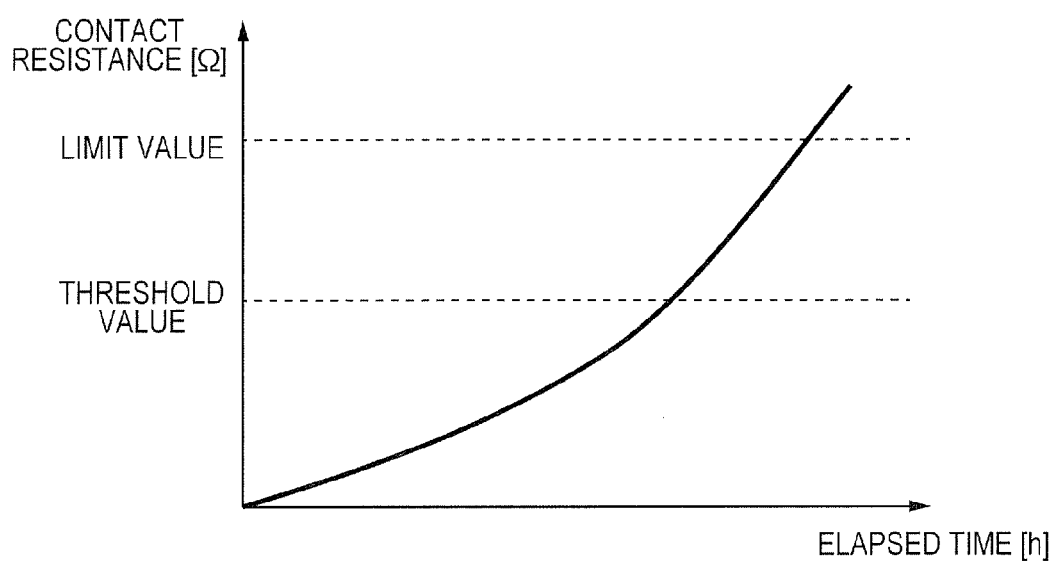
FIG. 8 is a schematic diagram illustrating a relation between an elapsed time and a value of a contact resistance, in the second embodiment.

FIG. 8 is a schematic diagram illustrating a relation between an elapsed time and the value of the contact resistance. As is illustrated in FIG. 8, the contact points in each of the contact units 420 and 520 deteriorate with the passage of time if being not maintained, and the value of the contact resistance between the contact points increases. Accordingly, the controlling circuit 101 determines the contact resistance value by using the difference value that the value of the voltage which has been detected by the voltage detecting circuit 535 has been subtracted from the value of the voltage which has been detected by the voltage detecting circuit 435, and the current value which has been detected by the current detecting circuit 450. Then, the controlling circuit 101 determines whether or not the value of the contact resistance has exceeded the threshold value (threshold value of resistance). Here, in FIG. 8, in addition to the threshold value, a limit value is illustrated which is larger than the threshold value. The limit value is a value at which the tool becomes incapable of receiving the electric power or the signal, and the threshold value is preferably set at a value lower than the limit value.

If the contact point resistance value exceeds the limit value, the hand 400A and the tool 500 cannot mutually communicate. The hand controlling apparatus 431 of the hand 400A transmits a signal which shows an error to the controlling circuit 101 of the integrated controlling apparatus 100, and the controlling circuit 101 makes the robot 200 stop the operation.

Even if the contact point resistance value exceeds the threshold value, the hand 400A and the tool 500 can communicate mutually as long as the contact point resistance does not exceed the limit value. Accordingly, the controlling circuit 101 can acquire the voltage information from the voltage detecting circuit 535, and can compute the contact resistance value. In this case, the robot 200 is not stopped immediately, and the controlling circuit 101 issues the alert to urge the user to perform maintenance or replacement of the contact point at arbitrary timing for the user.

In other words, when the value of the contact resistance has exceeded the threshold value, the controlling circuit 101 only issues the alert for calling such an attention that the user needs to maintain the contact points, for instance, by cleaning and the like (S48), and does not make the robot 200 stop the operation. However, in the case of NG in the step S44, the tool cannot receive the signal, and accordingly the contact resistance value must exceed the limit value. Accordingly, the controlling circuit 101 issues the alert which shows an error in the step S47, and also makes the robot 200 (refer to FIG. 1) stop the operation.

The robot apparatus according to the second embodiment determines the contact resistance value by using the current value which has been detected by the current detecting circuit 450, then determines whether or not this contact resistance value exceeds the threshold value, and accordingly can determine the contact states between the contact points 423 and 424 and the contact points 523 and 524 with higher accuracy than that in the first embodiment.

The robot apparatus according to the second embodiment can determine the contact state of the contact point without a work. In addition, the robot apparatus can determine the contact state of the contact point at the same time when initializing the tool 500.

Figure 9A:
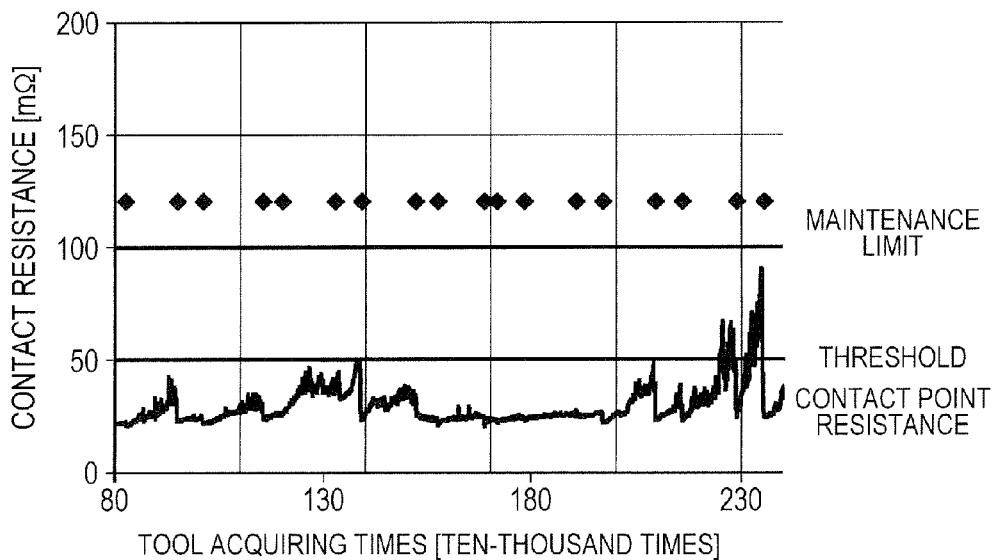
FIG. 9A is a graph illustrating a relation between the number of tool acquiring times by the hand and a value of the contact resistance, in the second embodiment.
Figure 9B:
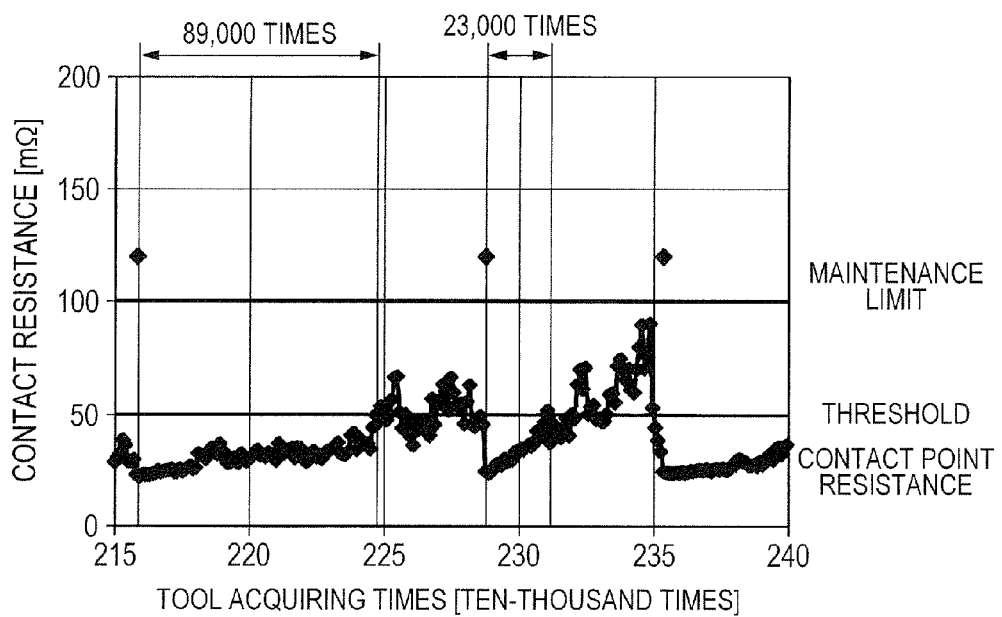
FIG. 9B is a graph in which a part of sections in FIG. 9A is expanded.

FIG. 9A is a graph illustrating the relation between the number of tool acquiring times by the hand and a value of the contact resistance. FIG. 9B is a graph in which a part of sections in FIG. 9A is expanded.

The values of the contact resistance between the contact points, which are plotted in FIG. 9A and FIG. 9B, are the maximum values obtained for every 1000 times of the tool acquiring times. In addition, the maintenance of wiping the surfaces of the contact points in each of the contact units 420 and 520 has been performed on every rhombic mark in FIG. 9A and FIG. 9B. The cycle of the maintenance has been set at once in every 40,000 times to 300,000 times.

As is illustrated in FIG. 9A, when the deterioration of the contact point progresses, the interval between the tool acquiring times at the time when the maintenance has been performed and the tool acquiring times at which the contact resistance value exceeds the threshold value becomes short. In FIG. 9B, the interval is shortened from 23,000 times to 89,000 times.

There are following two factors which shorten the interval. The first factor is a phenomenon that a plated film (of gold, nickel, rhodium or the like) on the surface of the contact point is peeled, thereby the base material (iron, copper or the like) is exposed, and the base material is oxidized. The second factor is a phenomenon that the surface of the contact point is deformed and cannot fully secure the contact area. Because of these factors, a deterioration occurs which cannot be avoided by the maintenance of wiping the contact point, and accordingly a replacement of the contact points, specifically, a replacement of the contact units 420 and 520 becomes necessary.

In the second embodiment, the integrated controlling apparatus 100 has the counter 105 which counts the number of times the hand 400A has acquired the tool 500, specifically, the number of times the tool device 510 has been mounted on the hand device 410. The counted value by the counter 105 is reset when a user has performed maintenance.

A threshold value (threshold value for count, for instance, 30,000 times) is set beforehand so that the integrated controlling apparatus 100 distinguishes whether or not the deterioration of the contact point can be restored by the maintenance. In other words, the threshold value for the count is stored in the memory 102 beforehand. The controlling circuit 101 determines whether or not the counted value by the counter 105 at the time when the contact resistance value has exceeded the threshold value is smaller than the threshold value for the count. Then, when having determined that the counted value is smaller than the threshold value for the count (for instance, 30,000>23,000 times), the controlling circuit 101 makes the monitor 104 display the image showing the notice thereon. Thereby, the user can grasp that the time has come to replace the contact point.

Third Embodiment

Next, a robot apparatus according to a third embodiment of the present invention will be described. Incidentally, the configuration of the robot apparatus is the same as that of the robot apparatus 10 in the first embodiment, and accordingly the detailed description will be omitted.

In the second embodiment, the case has been described where the robot apparatus 10 has the current detecting circuit 450. However, in the third embodiment, the robot apparatus does not detect the electric current, but stores the value of the electric current in the memory 102 beforehand. Accordingly, in the third embodiment, the current detecting circuit 450 can be omitted which has been described in the second embodiment. The controlling circuit 101 calculates the contact resistance value and determines the contact state similarly to that in the second embodiment.

The above description will be specifically described below. The memory 102 stores the value of the electric current beforehand which passes through the contact point 423 in the hand side contact unit 420, when the tool 500 (tool device 510) is in a predetermined state.

Figure 10:
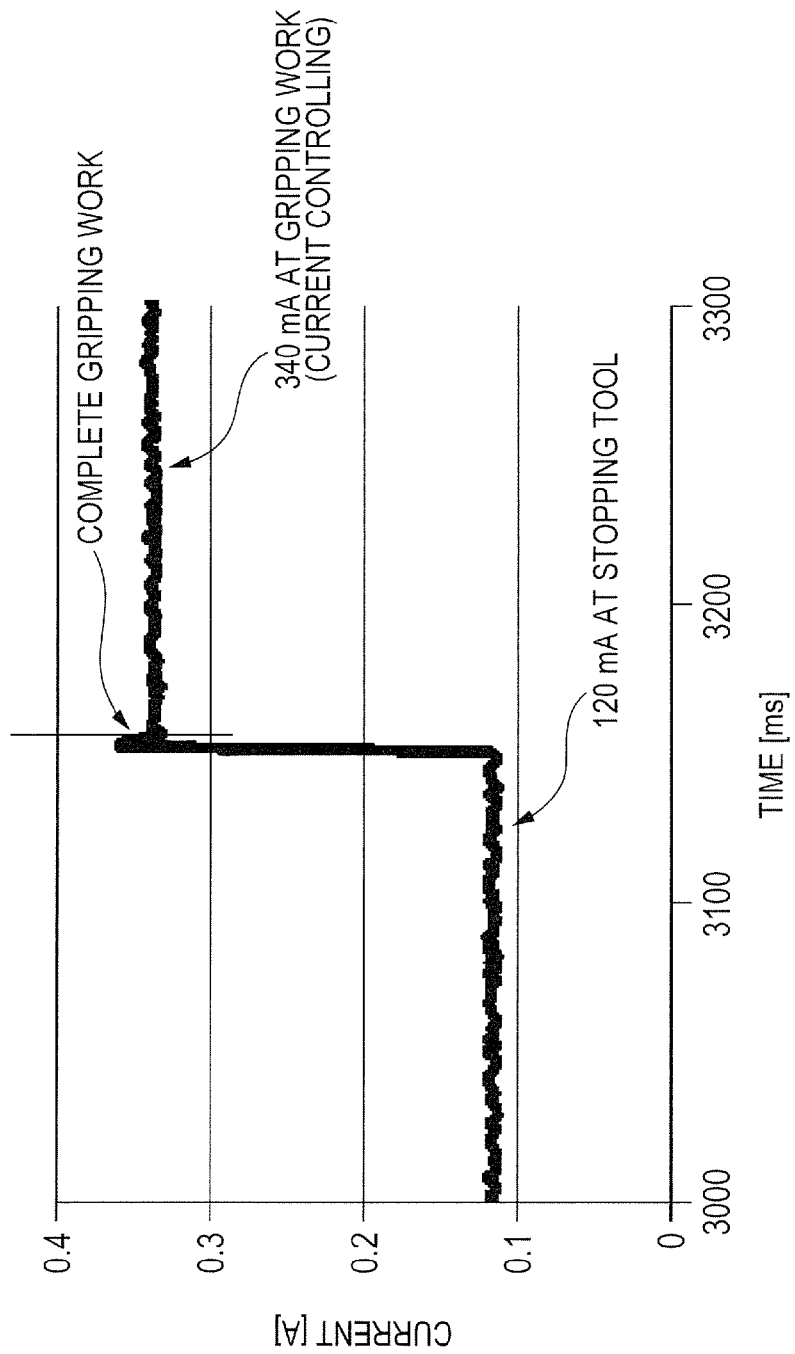
FIG. 10 is a graph illustrating experimental values of a current value of a power source, at the time when a tool stops and at the time after the tool has completed gripping a work, in a third embodiment.

FIG. 10 is a graph illustrating experimental values of a current value of a power source, at the time when the tool stops and at the time after the tool has completed gripping a work. The current value is 120 [mA] when the tool stops, but is 340 [mA] after the tool has completed gripping the work, where the latter value is about 2.8 times larger than the former value. The fluctuations of the current values (maximum−minimum) are each approximately 10 [mA] and are equivalent. Because the fluctuations are equivalent and the latter electric value is about 2.8 times larger than the former electric value, the resistance between the contact points can be measured with higher accuracy. Accordingly, in the third embodiment, the current value which is stored in the memory 102 shall be set at 340 [mA]. The predetermined state in the third embodiment is specifically a state in which a plurality of claws 402 grips the work.

When determining the contact state, the controlling circuit 101 acquires the value of the voltage from each of the voltage detecting circuits 435 and 535, in the case where a plurality of claws 502 grip the work. The controlling circuit 101 reads out the current value from the memory 102. Then, the controlling circuit 101 computes a contact resistance value using these data, similarly to that in the second embodiment. Then, the controlling circuit 101 determines whether or not the contact resistance value has exceeded the threshold value, similarly to that in the second embodiment.

As has been described above, the robot apparatus according to the third embodiment is configured to use the value which the user has set, specifically, the current value which has been stored in the memory 102, as the current value of the electric current for controlling the motor, and can determine the contact resistance value without the current detecting circuit.

The controlling circuit 101 determines whether or not the counted value by the counter 105 at the time when the contact resistance value has exceeded the threshold value is smaller than the threshold value for the count, similarly to that in the second embodiment. Then, when having determined that the counted value is smaller than the threshold value for the count, the controlling circuit 101 makes the monitor 104 display the image showing the notice thereon. Thereby, the user can grasp that the time has come to replace the contact point.

The current value to be stored in the memory 102 may be a current value (for instance, 120 [mA]) at the time when the tool stops, as a predetermined state of the tool 500 (tool device 510). In this case, the controlling circuit 101 may acquire the value of the voltage from each of the voltage detecting circuits 435 and 535, when the tool stops.

Fourth Embodiment

Figure 11:
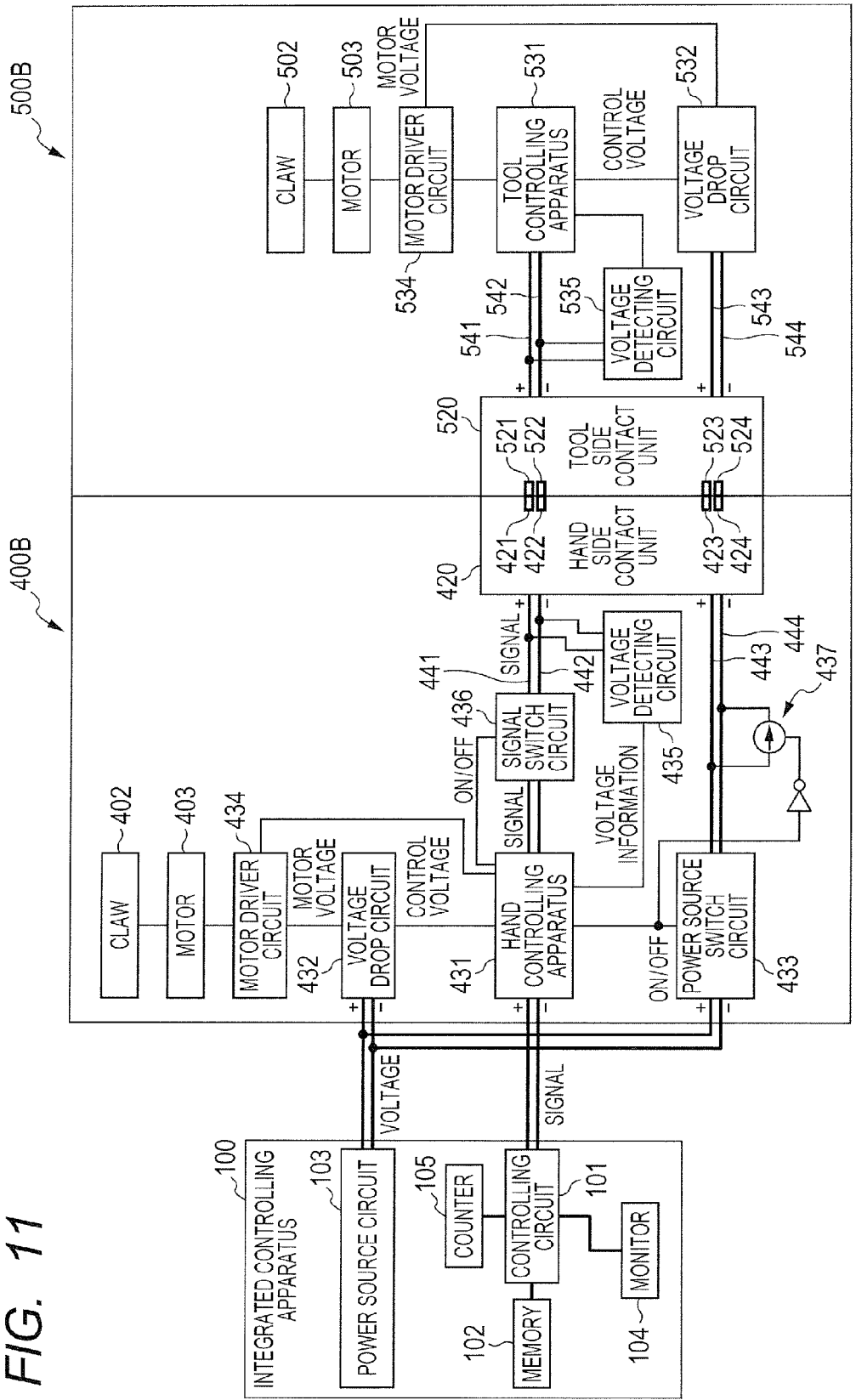
FIG. 11 is a block diagram illustrating an integrated controlling apparatus, a hand and a tool of a robot apparatus according to a fourth embodiment.

Next, a robot apparatus according to a fourth embodiment of the present invention will be described. FIG. 11 is a block diagram illustrating an integrated controlling apparatus, a hand and a tool of the robot apparatus according to the fourth embodiment of the present invention. In the first to the third embodiments, the case has been described where the voltage detecting circuits 435 and 535 detect the voltage in the power source side, but in the fourth embodiment, the case will be described where the voltage detecting circuits 435 and 535 detect the voltage in the signal side. Incidentally, in the fourth embodiment, the description of the configurations similar to those in the first embodiment will be omitted below.

A hand 400B has a voltage detecting circuit 435 which is a hand side voltage detecting unit, and a tool 500B has a voltage detecting circuit 535 which is a tool side voltage detecting unit. In other words, the voltage detecting circuit 435 is provided in the hand device 410 (refer to FIG. 1), and the voltage detecting circuit 535 is provided in the tool device 510 (refer to FIG. 1).

The degree of deterioration with the passage of time of each of the contact points in each of the contact units 420 and 520 is almost the same as the others, and accordingly in the fourth embodiment, contact states of the contact points 421 and 422 in the hand side contact unit 420 and the contact points 521 and 522 in the tool side contact unit 520 are determined.

Because of this, in the fourth embodiment, the voltage detecting circuit 435 detects voltage (potential difference) between the two contact points 421 and 422. Specifically, the voltage detecting circuit 435 detects the voltage between an arbitrary point (detecting point) of the signal wire 441 and an arbitrary point (detecting point) of the signal wire 442. Each of the detecting points is preferably close to each of the contact points 421 and 422, in consideration of also the voltage drop due to wiring resistance in each of the signal wires 441 and 442. In the fourth embodiment, the contact point 421 becomes a potential of the signal in the positive side, and the contact point 422 becomes a potential of the signal in the negative side; and accordingly, the voltage detecting circuit 435 detects the voltage of the contact point 421 relative to the contact point 422.

The voltage information (signal which shows value of voltage) which has been detected by the voltage detecting circuit 435 is output to the controlling circuit 101 of the integrated controlling apparatus 100, through the hand controlling apparatus 431.

The voltage detecting circuit 535 detects voltage (potential difference) between the two contact points 521 and 522. Specifically, the voltage detecting circuit 535 detects the voltage between an arbitrary point (detecting point) of the signal wire 541 and an arbitrary point (detecting point) of the signal wire 542. Each of the detecting points is preferably close to each of the contact points 521 and 522, in consideration of also the voltage drop due to wiring resistance in each of the signal wires 541 and 542. In the fourth embodiment, the contact point 521 becomes a potential of the signal in the positive side, and the contact point 522 becomes a potential of the signal in the negative side; and accordingly, the voltage detecting circuit 535 detects the voltage of the contact point 521 relative to the contact point 522.

The voltage information (signal which shows value of voltage) which has been detected by the voltage detecting circuit 535 is output to the controlling circuit 101 of the integrated controlling apparatus 100, through the tool controlling apparatus 531, the contact points 521 and 522, the contact points 421 and 422, and the hand controlling apparatus 431.

In the case where the controlling circuit 101 of the integrated controlling apparatus 100 acquires the voltage information from the voltage detecting circuits 435 and 535, firstly, the controlling circuit 101 outputs a signal for applying the voltage to the contact points 421 and 422 for a fixed period.

Here, the controlling circuit 101 outputs signals of different voltage levels from each other to the two contact points 421 and 422, respectively. The two signals which the controlling circuit 101 outputs become a differential signal. Then, the controlling circuit 101 stops the output of the signal, and becomes a state of waiting a signal.

The controlling circuit 101 acquires the value of the voltage which has been detected by the voltage detecting circuit 435, and the value of the voltage which has been detected by the voltage detecting circuit 535, when being in the state of waiting the signal.

At this time, the controlling circuit 101 acquires the signal which shows the value of the voltage which has been detected by the voltage detecting circuit 535, similarly to that in the first embodiment, through the contact points 521 and 522 and the contact points 421 and 422.

When determining the contact state, the controlling circuit 101 determines whether or not the difference value between the value of the voltage which has been detected by the voltage detecting circuit 435 and the value of the voltage which has been detected by the voltage detecting circuit 535 has exceeded a threshold value which has been set beforehand, similarly to that in the first embodiment. As has been described above, the robot apparatus according to the fourth embodiment can determine the contact state of the contact points in the contact units 420 and 520 even when using the contact points in the signal side, and shows a similar effect to that in the first embodiment.

Incidentally, the robot apparatus has determined the contact state based on the difference value, in the fourth embodiment, but may compute a contact resistance value by using the current value which has been detected by the current detecting circuit 450, or the current detection value which has been stored in the memory 102, and determine the contact state based on the contact resistance value, similarly to that in the second embodiment and the third embodiment.

Fifth Embodiment

Next, a robot apparatus according to a fifth embodiment of the present invention will be described. FIG. 12 is an explanatory view illustrating a robot apparatus according to the fifth embodiment of the present invention. Incidentally, the robot apparatus 10C in the fifth embodiment is a robot apparatus which has an inspection apparatus 700 added to the robot apparatus 10 that has been described in the first embodiment. Other configurations are similar to those in the first embodiment, and accordingly the description will be omitted.

The inspection apparatus 700 is a biaxial orthogonal robot, and a contact unit 720 in an inspection apparatus side and a maintenance unit 730 are provided at a head of a robot (main body of inspection apparatus) 710.

The robot 710 is structured so that the tool device 510 can be attached to and detached from the robot 710. The contact unit 720 is connected to the contact unit 520 by the movement of the robot 710. Specifically, the contact points of the contact unit 720 come in contact with the contact points of the tool side contact unit 520, when the tool device 510 has been mounted on the robot 710. An electric power and a signal are supplied to the contact unit 720 from the integrated controlling apparatus 100, through an inspection wiring 203 which passes through the inside of the robot 710. Accordingly, the controlling circuit 101 is enabled to supply the electric power and the signal to the tool 500 after the contact units 520 and 720 have been connected to each other, and to control the tool 500.

In the fifth embodiment, the inspection apparatus 700 has functions (hand controlling apparatus 431, voltage detecting circuit 435, power switch circuit 433, signal switch circuit 436 and the like) which the hand 400 that has been described in the first embodiment has.

After the contact units 520 and 720 have been connected to each other, the controlling circuit 101 determines the connected state of the contact point in a similar method to that in the first embodiment. Specifically, when the tool device 510 has been mounted on the robot 710, the controlling circuit 101 determines the contact state between the contact points in the contact unit 720 and the contact points in the contact unit 520, by using the value of the voltage that has been detected by the voltage detecting circuit 535 which is the tool side voltage detecting unit.

In the case where the result of having determined the contact state of the contact points is NG, the controlling circuit 101 makes the robot 710 operate to connect the maintenance unit 730 to the tool side contact unit 520, and makes the maintenance unit 730 maintain the tool side contact unit 520. The maintenance means an operation of wiping the surface of the contact points, and the like.

In the fifth embodiment, the robot apparatus can also make a work supplying apparatus (unillustrated) supply a work to the tool 500, and makes the tool 500 grip the work beforehand.

As has been described above, the robot apparatus according to the fifth embodiment can perform the inspection of the tool 500, the maintenance of the tool 500 and the like, in the time period in which the tool is not gripped by the robot 200 that is structured by the arm 300 and the hand 400 which actually operate. Thereby, the robot apparatus can enhance an operation efficiency of the whole apparatus.

In the fifth embodiment, the case has been described so as to correspond to the first embodiment where the voltage detecting circuits detect the voltage values in the power source side, the controlling circuit 101 determines the difference value between the voltages, and determines the contact state by using the difference value between the voltages, but the present invention is not limited to the case. In similar ways to those in the second to fourth embodiments, the controlling circuit 101 may determine the contact resistance value between the contact points in the power source side, and may determine the contact state; may determine the contact state based on the difference value between voltages of the contact points in the signal side; or may determine the state of the contact points based on the contact resistance value between the contact points in the signal side.

The present invention is not limited to the above described embodiments, but can be modified in many ways in a range of the technical concept of the present invention. In regard to the effects which have been described in the embodiments of the present invention, the most suitable effects that are created by the present invention are merely enumerated, and the effects according to the present invention is not limited to the effects which have been described in the embodiments of the present invention.

In the first to the fifth embodiments, the case has been described where the robot apparatus is configured so that the voltage detecting circuit 435 detects the voltage in the hand side or the inspection apparatus side, but the present inventions is not limited to the case. When the voltage drop can be neglected in the hand side or the inspection apparatus side, the voltage detecting circuit 435 may be omitted in the hand side or the inspection apparatus side. In this case, the controlling circuit may determine whether or not the value of the voltage which has been detected only by the voltage detecting circuit 535 in the tool side has exceeded the threshold value, or may store the value of the voltage in the hand side or the inspection apparatus side in the memory unit beforehand, calculate a difference value or a contact resistance value by using this stored value, and determine whether or not the difference value or the contact resistance value has exceeded the threshold value.

In addition, in the first embodiment, the case has been described where each of the contact units 420 and 520 has the contact points 424 and 524 set at the ground, but the present invention can also be applied to the case where cases of the hand 400 and the tool 500 are set at the ground. In this case, the voltage detecting circuit 435 may detect a voltage (that is, potential) of the contact point 423 relative to the ground (case), and the voltage detecting circuit 535 may detect a voltage (that is, potential) of the contact point 523 relative to the ground (case). In this case, the controlling circuit results in determining the connected state between the contact point 423 and the contact point 523. The similar configuration may be applied to the second to the fifth embodiments. In the fourth embodiment in particular, the type of signal is a differential signal, and accordingly the controlling circuit has determined the connected states between the two contact points 421 and 422 and the two contact points 521 and 522, but the controlling circuit may determine either one, for instance, the connected state between the contact point 421 and the contact point 521.

In addition, in the first to the fifth embodiments, the case has been described where the signal is the differential signal, but even though the signal is a single end signal, the present invention is applicable. In the case of the single end signal in the fourth embodiment, in particular, the voltage detecting circuits 435 and 535 may detect the voltage between a contact point (for instance, contact point 421 or 521) in the signal side and a contact point (for instance, contact point 424 or 524) in the ground side. Alternatively, when the case is set at the ground, the voltage detecting circuits 435 and 535 may detect the voltage (that is, potential) between the contact point in the signal side and the ground.

In addition, in the first to the fifth embodiments, the case has been described where the controlling unit is the controlling circuit 101 of the integrated controlling apparatus 100, but the present invention is not limited to the case. The controlling unit may be, for instance, the hand controlling apparatus 431 of the hand 400 (in the case of inspection apparatus 700, controlling apparatus of inspection apparatus 700). Incidentally, the case has been described where the hand controlling apparatus 431 is arranged in the inside of the hand device 410, but the hand controlling apparatus may be provided in the outside of the hand device 410, for instance, in the arm 300 side, in the integrated controlling apparatus 100 side, or in a different body from the above described sides. Concerning also the inspection apparatus 700, the above description is similar. Furthermore, concerning also the voltage detecting circuit 435 in the hand side, the above description is similar.

In addition, in the first to the fifth embodiments, the case has been described where the voltage detecting circuit 535 in the tool side transmits the signal which shows the value of the voltage that the voltage detecting circuit 535 has detected, to the controlling circuit 101 of the integrated controlling apparatus 100 through a signal wire, what is called, the case where cable communication is performed, but the present invention is not limited to the case. In the case where the tool 500 and the integrated controlling apparatus 100 have a radio communication equipment installed therein, the voltage detecting circuit 535 may transmit the signal which shows the value of the voltage that the voltage detecting circuit 535 has detected, to the controlling circuit 101 of the integrated controlling apparatus 100, through wireless communication.

In addition, in the first to the fifth embodiments, the case has been described where the arm 300 is the vertical multi-joint robot arm, but the present invention is not limited to the case. The arm to which the hand is attached may be various robot arms, such as a horizontal multi-joint robot arm, a parallel link robot arm and an orthogonal robot, for instance.

In addition, in the first to the fifth embodiments, the case where the robot apparatus has one unit of the robot 200 and one unit of the tool 500, but the present invention is not limited to the case, and the robot apparatus may have a plurality of robots 200 and/or a plurality of tools 500.

In addition, in the first, the second, the third and the fifth embodiments, the case has been described where the robot apparatus determines the contact state of the contact points in the power source side, and in the fourth embodiment, the case has been described where the robot apparatus determines the contact state of the contact points in the signal side. However, the present invention is not limited to the case, and the robot apparatus may determine the contact states of the contact points both in the power source side and in the signal side.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-036691, filed Feb. 26, 2015, which is hereby incorporated by reference herein in its entirety.

What is claimed is:
1. A robot apparatus comprising:
a hand device;
a hand side contact point which is provided in the hand device and to which a voltage is applied;
a tool device which can be attached to and detached from the hand device;
a tool side contact point which is provided in the tool device, and comes in contact with the hand side contact point as the tool device is mounted on the hand device;
a tool side voltage detecting unit which is provided in the tool device, and detects a voltage of the tool side contact point;

a controlling unit which determines a contact state between the hand side contact point and the tool side contact point, by using a value of the voltage that has been detected by the tool side voltage detecting unit; and a hand side voltage detecting unit which detects a voltage of the hand side contact point, wherein the controlling unit determines the contact state by using a value of the voltage which has been detected by the hand side voltage detecting unit and the value of the voltage which has been detected by the tool side voltage detecting unit.

2. The robot apparatus according to claim 1, further comprising:

a current detecting unit which detects an electric current that passes through the hand side contact point, wherein the controlling unit determines the contact state by using an electric resistance value that is based on the value of a voltage which has been detected by the hand side voltage detecting unit, on the value of the voltage which has been detected by the tool side voltage detecting unit and on a value of an electric current which has been detected by the current detecting unit.

3. The robot apparatus according to claim 2, further comprising:

a counter which counts the number of times the tool device has been mounted on the hand device; and an annunciation unit which sends a notice according to instructions of the controlling unit, wherein the controlling unit determines whether or not a counted value by the counter at the time when the electric resistance value has exceeded a threshold value which has been set beforehand is smaller than a threshold value for the count, which has been set beforehand, and when having determined that the counted value is smaller than the threshold value for the count, the controlling unit makes the annunciation unit send the notice.

4. The robot apparatus according to claim 1, further comprising a power source unit which applies a direct-current voltage to the hand side contact point.

5. The robot apparatus according to claim 4, comprising two of the hand side contact points and two of the tool side contact points, wherein the power source unit applies a direct-current voltage between the two hand side contact points, and the tool side voltage detecting unit detects a voltage between the two tool side contact points.

6. The robot apparatus according to claim 1, in which the tool device comprises a base unit, a plurality of claws that is supported by the base unit, and can grip or release a grip of a work, and an electric motor which drives the plurality of claws, further comprising:

a power source unit which applies a direct-current voltage to the hand side contact point and supplies an electric power to the electric motor; and a memory unit which stores a value of an electric current beforehand that passes through the hand side contact point when the tool device is in a predetermined state, wherein in a case of a determining the contact state, the controlling unit determines the contact state by using an electric resistance value that is based on the value of a voltage which has been detected by the hand side voltage detecting unit, on the value of the voltage which has been detected by the tool side voltage detecting unit and on the value of the electric current which has been stored by the memory unit.

7. The robot apparatus according to claim 6, wherein the predetermined state is a state in which the plurality of claws grips the work.

8. The robot apparatus according to claim 6, further comprising:

a counter which counts the number of times the tool device has been mounted on the hand device; and an annunciation unit which sends a notice according to instructions of the controlling unit, wherein the controlling unit determines whether or not a counted value by the counter at the time when the electric resistance value has exceeded a threshold value which has been set beforehand is smaller than a threshold value for the count, which has been set beforehand, and when having determined that the counted value is smaller than the threshold value for the count, the controlling unit makes the annunciation unit send the notice.

9. The robot apparatus according to claim 8, wherein the controlling unit acquires the signal which shows the value of the voltage which has been detected by the tool side voltage detecting unit, through the tool side contact point and the hand side contact point.

10. The robot apparatus according to claim 1, further comprising:

a hand side signal contact point which is provided in the hand device and constitutes a transmission path of a signal; and a tool side signal contact point which is provided in the tool device, and comes in contact with the hand side signal contact point when the tool device has been mounted on the hand device; wherein the controlling unit acquires the signal which shows a value of the voltage which has been detected by the tool side voltage detecting unit, through the tool side signal contact point and the hand side signal contact point.

11. The robot apparatus according to claim 10, further comprising a tool controlling unit which is provided in the tool device and controls an operation of the tool device in response to an input of an operation signal, wherein the controlling unit outputs the operation signal to the tool controlling unit, through the hand side signal contact point and the tool side signal contact point.

12. The robot apparatus according to claim 1, wherein the controlling unit outputs a signal for applying a voltage to the hand side contact point.

13. The robot apparatus according to claim 12, comprising two of the hand side contact points and two of the tool side contact points, wherein the controlling unit outputs signals of different voltage levels from each other, to the two hand side contact points, respectively, and the tool side voltage detecting unit detects a voltage between the two tool side contact points.

14. The robot apparatus according to claim 13, wherein two signals which the controlling unit outputs are differential signals.

15. The robot apparatus according to claim 1, further comprising:

a main body of an inspection apparatus which the tool device can be attached to and detached from; and an inspection apparatus side contact point which is provided in the main body of the inspection apparatus, and comes in contact with the tool side contact point when the tool device has been mounted on the main body of the inspection apparatus to have a voltage applied thereto, wherein the controlling unit determines the contact state between the inspection apparatus side contact point and the tool side contact point, by using a value of the voltage that has been detected by the tool side voltage detecting unit, when the tool device has been mounted on the main body of the inspection apparatus.

16. The robot apparatus according to claim 1, wherein the hand is attached to a robot arm.

17. The robot apparatus according to claim 1, wherein the controlling unit determines the contact state by using a difference value between a value of the voltage which has been detected by the hand side voltage detecting unit and the value of the voltage which has been detected by the tool side voltage detecting unit.

18. The robot apparatus according to claim 17, wherein, when determining the contact state, the controlling unit determines whether or not the difference value has exceeded a threshold value which has been set beforehand.

19. The robot apparatus according to claim 18, further comprising:

a counter which counts the number of times the tool device has been mounted on the hand device; and an annunciation unit which sends a notice according to instructions of the controlling unit, wherein the controlling unit determines whether or not a counted value by the counter at the time when the difference value has exceeded the threshold value is smaller than a threshold value for the count, which has been set beforehand, and when having determined that the counted value is smaller than the threshold value for the count, the controlling unit makes the annunciation unit send the notice.

* * * * *